(12) United States Patent
Fodor et al.

(10) Patent No.: US 6,788,646 B1
(45) Date of Patent: Sep. 7, 2004

(54) LINK CAPACITY SHARING FOR THROUGHPUT-BLOCKING OPTIMALITY

(75) Inventors: Gabor Fodor, Hässelby (SE); Miklós Telek, Budapest (HU); Sándor Rácz, Cegléd (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/559,988

(22) Filed: Apr. 26, 2000

Related U.S. Application Data

(60) Provisional application No. 60/159,351, filed on Oct. 14, 1999.

(51) Int. Cl.[7] .................. G01R 31/08; G06F 11/00; H04J 1/16; H04J 3/14; H04L 1/00
(52) U.S. Cl. .................. 370/230; 370/235; 370/229
(58) Field of Search ................... 370/401, 231, 370/232, 235, 230.1, 234, 229, 230, 468, 233, 237, 238; 709/223, 235, 226; 379/111, 112.01, 112.04, 112.05, 112.08, 112.03

(56) References Cited

U.S. PATENT DOCUMENTS

| | | | |
|---|---|---|---|
| 5,274,644 A | | 12/1993 | Berger et al. ............ 370/95.1 |
| 5,583,792 A | * | 12/1996 | Li et al. ................. 709/224 |
| 5,881,049 A | | 3/1999 | Beshai et al. ............ 370/230 |
| 5,909,443 A | | 6/1999 | Fichou et al. ............ 370/412 |
| 5,914,945 A | | 6/1999 | Abu-Amara et al. ...... 370/329 |
| 6,072,800 A | * | 6/2000 | Lee ....................... 370/412 |
| 6,115,359 A | * | 9/2000 | Depelteau et al. ........ 370/232 |
| 6,118,764 A | * | 9/2000 | Depelteau et al. ........ 370/235 |
| 6,266,322 B1 | * | 7/2001 | Berger et al. ............ 370/229 |
| 6,366,559 B1 | * | 4/2002 | Krishnan et al. ......... 370/230 |
| 6,418,139 B1 | * | 7/2002 | Akhtar .................... 370/356 |

FOREIGN PATENT DOCUMENTS

| | | |
|---|---|---|
| WO | WO 97/01895 | 1/1997 |
| WO | WO 98/28938 | 7/1998 |
| WO | WO 98/41052 | 9/1998 |
| WO | WO 99/11003 | 3/1999 |
| WO | WO 99/34544 | 7/1999 |

OTHER PUBLICATIONS

International Search Report completed by the ISA/SE on Mar. 20, 2001 in connection with priority application PCT/SE00/01827 as mailed on Mar. 23, 2001.

Frontini, M., et al; "Entropy–Convergence in Stieltjes and Hamburger Moment Problem," *Applied Mathematics and Computation*, 88:39–51 (1997); Elsevier Science, Inc., New York, NY, pp. 39–51.

(List continued on next page.)

*Primary Examiner*—Wellington Chin
*Assistant Examiner*—Jamal A. Fox

(57) ABSTRACT

The invention concerns an efficient strategy for sharing link bandwidth in a mixed rigid-elastic traffic environment, as well as a strategy for sharing bandwidth among elastic traffic flows. The idea according to the invention is to sharing the link bandwidth among rigid and elastic traffic by dividing the link bandwidth into a first common part $C_{COM}$ for elastic as well as rigid traffic and a second part $C_{ELA}$ dedicated for elastic traffic. Subsequently, one or more admission control parameters for the elastic traffic are determined in order to restrict the number of elastic traffic flows simultaneously present on the link. In particular, by formulating a call-level model for elastic traffic and determining a maximum number $N_{ELA}$ of admissible elastic traffic flows based on call-level constraints for the elastic traffic related to throughput and/or blocking, the so-called throughput-to-blocking trade-off for elastic traffic can be fully considered.

50 Claims, 7 Drawing Sheets

OTHER PUBLICATIONS

Roberts, J.W., et al.; "Bandwidth Sharing and Admission Control for Elastic Traffic," France Telecomm–CNET, ITC Seminar, Yokohama (1998), pp. 1–9.

Ross, K.W., *Multi–Service Loss Models for Broadband Telecommunications Networks,* Springer Verlag London Limited, ISBN 3–540–19918–7 (1995), "Multiservice Loss Systems, Chapter 1: 1.1–1.6; The Stochastic Knapsack," Chapter 2: 2.1–2.10, pp. 1–68.

"Traffic Control and Congestion Control in B–ISDN," ITU–T Recommendation I.371, Traffic Management Specification (Helsinki, Mar. 1993), pp. 1–26.

Massoulié, L., et al.; "Bandwidth Sharing: Objectives and Algorithms," France Telecom–CNET, IEEE Jun. 1999, pp. 1395–1403.

Massoulié, L., et al; "Arguments in Favour of Admission Control for TCP Flows," $16^{th}$ International Teletraffic Congress, Edinburgh, UK, Jun. 1999, pp. 1–16.

Feng, W., et al.; "Understanding and Improving TCP Performance Over Networks with Minimum Rate Guarantees," IEEE/ACM Transactions on Networking, vol. 7, No. 2, Apr. 1999, pp. 173–187.

Gibbens, R.J., et al.; "Distributed Connection Acceptance Control for a Connectionless Network,"ITC $16/16^{th}$ International Teletraffic Congress, Edinburgh, UK, Jun. 1999 pp. 941–952.

Kelly, F., "Charging and Rate Control for Elastic Traffic," European Transactions on Telecommunications, vol. 8 (1997), pp. 1–11 [corrected version].

Bobbio, A., et al.; "Computation of the Distribution of the Completion Time When the Work Requirement is a PH Random Variable," Commun. Statist.–Stochastic Models, 6(1), 1990, pp. 133–150.

Bonomi, F., et al.; "The Rate–Based Flow Control Framework for the Available Bit Rate ATM Service," IEEE Network, Mar./Apr. 1995, pp. 25–39.

Borst, S., Virtual Partitioning for Robust Resource Sharing: Computational Techniques for Heterogeneous Traffic, IEEE Journal on Selected Areas in Communications, vol. 15, No. 5, Jun. 1998, pp. 668–678.

Chen, T., et al., "The Available Bit Rate Service for Data in ATM Networks," IEEE Communications Magazine, May 1996, pp. 56–71.

Choudhury, G., et al., "Efficiently Providing Multiple Grades of Service with Protection Against Overloads in Shared Resources," AT&T Technical Journal, Jul./Aug. 1995, pp. 50–63.

Dziong, Z.,et al., "Call Admission and Routing in Multi–Service Loss Networks," IEEE Transactions on Communication, vol. 42, No. 2/3/4, Feb./Mar./Apr. 1994, pp. 2011–2022.

Faragó, A., et al., "A New Degree of Freedom in ATM Network Dimensioning: Optimizing the Logical Configuration," IEEE Journal of Selected Areas in Communications, vol., 13, No., 7, Sep. 1995, pp. 1199–1206.

Fodor, G., et al., "Revenue Optimization and Fairness Control of Priced Guaranteed and Best Effort Services on an ATM Transmission Link," IEEE International Conference on Communications, ICC '98, Atlanta, GA, Jun. 1998, pp. 1696–1705.

Kaufman, J., "Blocking in a Shared Resource Environment," IEEE Transactions on Communications, vol. Com–29, No. 10, Oct. 1981, pp. 1474–1481.

Mitra, D., et al., "Robust Dynamic Admission Control for Unified Cell and Call QoS in Statistical Multiplexers," IEEE Journal on Selected Areas in Communications, vol. 16, No. 5, Jun. 1998, pp. 692–707.

Mitra, D., et al., "ATM Network Design and Optimization: A Multirate Loss Network Framework," IEEE/ACM Transactions on Networking, vol. 4. No. 4, Aug. 1996, pp. 531–543.

Nilsson, A.A., et al, "Multirate Blocking Probabilities: Numerically Stable Computations," ITC 15 / International Teletraffic Congress, Washington, D.C., Jun. 1997, pp. 1359–1368.

Nordström, E., "Near–Optimal Link Allocation of Blockable Narrow–Band and Queueable Wide–Band Call Traffic in ATM Networks," ITC 15 / International Teletraffic Congress, Washington, D.C., Jun. 1997, pp. 987–996.

Roberts, J.W., "Realizing Quality of Service Guarantees in Multiservice Networks," *Performance and Management of Complex Communication Networks,* T. Hasegawa, et al (Eds.) 1998, pp. 277–293.

Roberts, J.W., "Quality of Service Guarantees and Charging in Multiservice Networks," IEICE Transactions on Communications, Spec. Issue on ATM Traffic Control and Performance Evaluation, vol. E81–B, No. 5, May 1998, pp. 824–831.

Roberts, J.W., "Connection Admission Control," Methods for the Performance Evaluation and Design of Broadband Multiservice Networks, Published by the Commission of European Communities, Information Technology and Sciences, COST 242, Final Report, 1996, pp. 115–171.

Rosenberg, S., et al., "Functionality at the Edge: Designing Scalable Multiservie ATM Networks," IEEE Communications Magazine, May 1998, pp. 88–99.

Ross, K.W., et al, "Optimal Circuit Access Policies in an ISDN Environment: A Markov Decision Approach," IEEE Transactions on Communications, vol. 37, No. 9, Sep. 1989, pp. 934–939.

DeSerres, Y., et al., "A Multiserver Queue with Narrow– and Wide–Band Customers and Wide–Band Restricted Access," IEEE Transactions on Communications, vol. 36, No. 6, Jun. 1988, pp. 675–684.

Smith, A., et al., "Available Bit Rate—A New Service for ATM," Computer Networks and ISDN Systems, 28, (1996) pp. 635–640.

Ross, K.W., *Multi–Service Loss Models for Broadband Telecommunications Networks,* Springer Verlag London Limited, ISBN 3–540–19918–7 (1995) "Chapter 2: The Stochastic Knapsack," pp. 17–70.

Sykos, E.D., et al., "Simulative Analysis of Optimal Resource Allocation and Routing in IBCN's," IEEE Journal on Selected Areas in Communications, vol. 9, No. 3, Apr. 1991, pp. 486–492.

Telek, M., et al, "Numerical Analysis of Large Markov Reward Models," Performance Evaluation 36–37 (1999), pp. 95–114.

Fodor, G. et al., "Simulative Analysis of Routing and Link Allocation Strategies in ATM Networks Supporting ABR Services," *IEICE Trans. Commun.*vol. E81–B No. 5, May 1998, pp. 985–995.

\* cited by examiner

LINK CAPACITY SHARING FOR THROUGHPUT-BLOCKING OPTIMALITY

CROSS-REFERENCES TO RELATED APPLICATIONS

This Application for Patent claims the benefit of priority from, and hereby incorporates by reference the entire disclosure of, U.S. Provisional Application for Patent Serial No. 60/159,351, filed Oct. 14, 1999.

TECHNICAL FIELD OF THE INVENTION

The present invention generally relates to the field of communication networks, and in particular to link capacity sharing and link bandwidth allocation in such networks.

BACKGROUND

Many communication networks of today support so-called elastic traffic such as the "best effort" services provided in Internet Protocol (IP) based networks or the Available Bit Rate (ABR) traffic in ATM networks. Elastic traffic is typically established for the transfer of a digital object, such as a data file, a Web page or a video clip for local playback, which can be transmitted at any rate up to the limit imposed by the link capacity. Web browsing on the Internet in particular is a good and representative example of elastic traffic. Here, the "elasticity" of the traffic is apparent as the user-perceived throughput (normally given in transmitted bits or bytes per time unit) when downloading for example a web page fluctuates in time depending on the overall system load.

The services delivered by IP based networks and the Internet in particular are called "best effort", because the networks generally do not provide any guarantee of the quality of service (QoS) received by the applications. The IP network only makes a best effort to provide the requested service. For instance, if an application requests the network to deliver an IP packet from one end-point to another, the network normally can not say what the delay through the network will be for that packet. In fact, the network does not even guarantee tat the packet will be delivered at all.

Therefore, terminals connected to an IP network have to handle packet losses and excessive packet delay situations. Such situations occur when there are too many applications simultaneously using the network resources. These congestion situations have a non-zero probability in IP based networks, because IP networks do not exercise call admission control (CAC). In other words, IP networks do not restrict the number of simultaneously connected users, and consequently if there are too many users utilizing the network resources there will be congestion and packet losses.

However, with the advent of real-time traffic and QoS requirements in EP networks, there is a need for exercising call admission control (CAC) in order to restrict the number of connections simultaneously present in the network.

An important aspect of call or connection admission control is that new calls arriving to the network may be rejected service in order to protect in-progress calls. In general, CAC algorithms such as those commonly in use for rigid traffic in conventional ATM networks provide a basic means to control the number of users in the network, thereby ensuring that admitted users get the bandwidth necessary to provide the QoS contracted for. Consequently, a CAC algorithm represents a trade-off between the blocking probability for new calls and the provided throughput for in-progress calls. In other words, the more users that the CAC algorithm admits into the network (which reduces the blocking probability) the smaller the provided throughput per-user becomes, since a greater number of users will share the total bandwidth, and vice versa.

Recent research has indicated that it is meaningful to exercise call admission control even for elastic traffic, because CAC algorithms provide a means to prevent TCP sessions from excessive throughput degradations.

The issue of applying CAC for elastic connections, and thereby providing a minimum throughput for Transmission Control Protocol (TCP) connections in the Internet has been addressed by Massoulie and Roberts in references [1–3]. Here, bandwidth is allocated to different users according to some fairness criteria.

It has been recognized by Gibbens and Kelly in references [4–5] that there is an intimate relationship between throughput and blocking probabilities for elastic traffic, and that this trade-off is connected to the issue of charging.

It has also been shown by Feng et al. in reference [6] that providing a minimum rate guarantee for elastic services is useful, because in that case the performance of the TCP protocol can be optimized.

As the Internet evolves from a packet network supporting a single best effort service class towards an integrated infrastructure for several service classes, there is also a growing interest in devising bandwidth sharing strategies, which meet the diverse needs of peak-rate guaranteed services and elastic services.

Similarly, modern ATM networks need to support different service classes such as Constant Bit Rate (CBR) and Available Bit Rate (ABR) classes, and it is still an open question how to optimally share the link capacity among the different service classes.

In general, the issue of bandwidth sharing, in the context of dynamically arriving and departing traffic flows and especially when users have different throughput and blocking requirements, is known from the classical multi-rate circuit switched framework to be an extremely complex problem.

SUMMARY OF THE INVENTION

The present invention overcomes these and other drawbacks of the prior art arrangements.

It is a first object of to invention to devise a link capacity/bandwidth sharing strategy that meets the diverse needs of rigid and elastic services in a mixed rigid-elastic traffic environment.

In particular, it is desirable to treat the issues of bandwidth sharing and blocking probabilities for elastic traffic in a common framework. In this respect, it is a second object of the present invention to provide a link capacity sharing mechanism that considers the throughput-to-blocking trade-off for elastic traffic. Specifically, it would be beneficial to develop and utilize a link capacity sharing algorithm that optimizes the throughput-to-blocking trade-off.

It is a further object of the invention to provide an appropriate call-level model of a transmission link carrying elastic traffic and to apply the call-level model for dimensioning the link bandwidth sharing for throughput-blocking optimality.

These and other objects are met by the invention as defined by the accompanying patent claims.

The invention concerns an efficient strategy for sharing link bandwidth in a mixed rigid-elastic traffic environment, as well as a strategy for sharing bandwidth among elastic traffic flows.

Briefly, the idea according to the invention is to share link capacity in a network by dividing the link capacity into a first common part for elastic as well as rigid (non-elastic) traffic and a second part dedicated for elastic traffic based on received network traffic inputs. Subsequently, one or more admission control parameters for the elastic traffic are determined based on the division of link capacity as well as received network traffic inputs.

The division of link capacity generally serves to share the link capacity between rigid and elastic traffic, and in particular to reserve a part of the link capacity to elastic traffic. Preferably, a minimum required capacity of the common part relating to rigid traffic is determined given a maximum allowed blocking probability for the rigid traffic. In this way, a certain grade of service (GoS) on call level is guaranteed for the rigid traffic on the link.

The admission control parameter(s) determined for elastic traffic generally serves to restrict the number of elastic traffic flows simultaneously present on the link. In particular, by formulating a call-level model for elastic traffic and determining a maximum number of admissible elastic traffic flows based on call-level constraints for the elastic traffic related to throughput and/or blocking, the throughput-to-blocking trade-off is fully considered. In this respect, the invention is capable of optimally allocating link bandwidth among elastic connections in the sense that blocking probabilities are minimized under throughput constraints, or the other way around, in the sense that the throughput is maximized under blocking constraints. In his way, the invention provides maximum link bandwidth utilization, either in terms of minimum blocking under throughput constraints or maximum throughput under blocking constraints.

Accordingly, an efficient strategy for sharing bandwidth in a mixed rigid-elastic traffic environment is provided. In particular, the bandwidth sharing algorithm guarantees a maximum blocking for rigid traffic as well as a minimum throughput and/or a maximum blocking for elastic traffic.

An important technical advantage of the invention is its ability to meet the diverse needs of rigid traffic and elastic traffic.

Another advantage of the invention is the ability to provide predictable quality of service for both the user and the network provider while at the same time ensuring high network provider revenue.

By considering only the elastic traffic of the overall traffic in a mixed rigid-elastic traffic environment, or alternatively by reducing the common bandwidth part to zero so that the entire link is reserved for elastic traffic, the overall link capacity sharing mechanism is reduced to We determination of one or more admission control parameters for elastic traffic. Admission control for requested new elastic connections can then be exercised based on such admission control parameter(s). In particular, by minimizing the blocking probabilities with respect to the number of admissible elastic connections under given throughput constraints for the elastic traffic, excessive blocking probabilities are avoided, while ensuring a given user throughput.

Another aspect of the invention concerns the application of a call-level model of a link supporting elastic traffic, for dimensioning the link bandwidth sharing for throughput-blocking optimality in an admission-control enabled IP network. In particular, an elastic traffic flow is modeled as having a bandwidth that fluctuates between a minimum bandwidth and peak bandwidth during the holding time of the traffic flow. Furthermore, the elastic traffic is associated with at least one of a minimum accepted throughput and a maximum accepted blocking probability.

A further aspect of the invention concerns a computational method for determining a Maxkov chain steady state distribution that is particularly advantageous for large state spaces. The Markov chain describes the dynamics of a link carrying a number of traffic classes including non-adaptive elastic traffic, and the computational method provides a good initial approximation of the steady state distribution based on Markov chain product form calculations.

Other aspects or advantages of the present invention will be appreciated upon reading of the below description of the embodiments of the invention.

BRIEF DESCRIPTION OF THE DRAWINGS

The invention together with further objects and advantages thereof, will be best understood by reference to the following description taken together with the accompanying drawings, in which.

DETAILED DESCRIPTION OF EMBODIMENTS OF THE INVENTION

Figure 1:
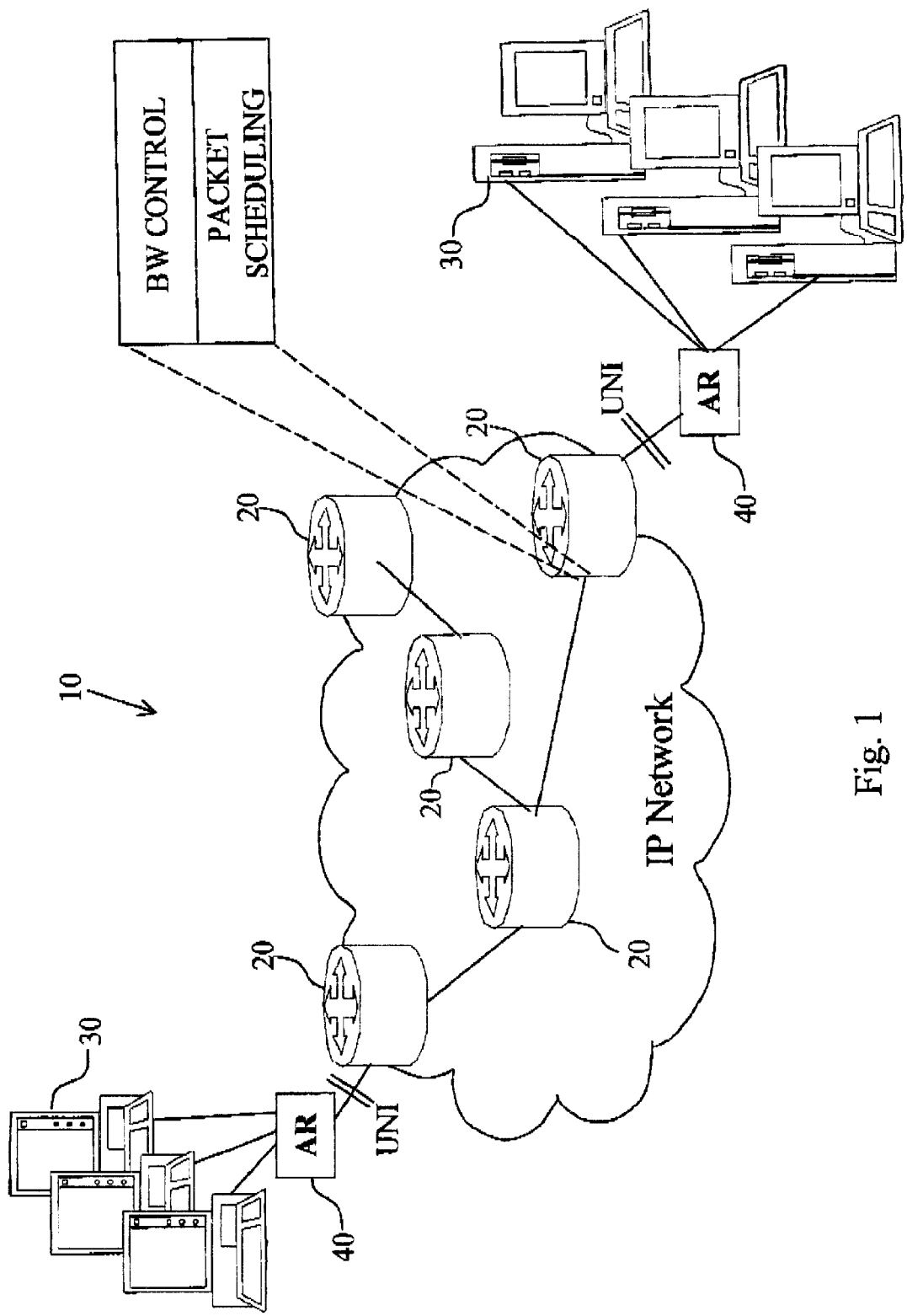
FIG. 1 is a schematic diagram of a communication network according to a preferred embodiment of the invention.

Throughout the drawings, the same reference characters will be used for corresponding or similar elements.

Throughout the disclosure, the terms connection and flow are used more or less interchangeably for what is traditionally denoted as a call.

System Overview of an Illustrative Communication Network

For a better understanding, a general overview of an illustrative communication network according to a preferred embodiment of the invention will now be made with reference to FIG. 1.

FIG. 1 is a schematic diagram of a communication network according to a preferred embodiment of the invention. The communication network is here illustrated as an IP based network, but may be in the form of an ATM network or any other type of network or combination of networks capable of supporting elastic traffic. The communication network 10 is based on a number of interconnected IP routers 20 (ATM switches in the case of an ATM network) forming the core network. The core network is accessed by different users 30 (computers, servers, etc.) through access points, with a so called user-network interface (UNI) being defined for the interaction between the IP routers and the user equipment. Typically, a plurality of users are connected to some form of aggregation point, such as an access router (AR) 40, which acts an intermediate between the end-users and the core network.

Link capacity sharing, also referred to as bandwidth control in the network context, and packet scheduling normally reside on the network side of the UNI, within the IP routers 20. In particular, the bandwidth control and packet scheduling are preferably implemented at the output port side of the routers 20. The overall bandwidth control has two main functions. First, the bandwidth control serves to share the bandwidth between different traffic classes. Second, the bandwidth control serves to restrict the number of simultaneously active connections within the traffic classes. The latter function is hereinafter referred to as call admission control (CAC), and is normally exercised at the input port side of the IP routers 20, where connections are accepted or rejected in accordance with some CAC algorithm. The overall bandwidth control algorithm, including the CAC algorithm, may be for example implemented as hardware, software, firmware or any suitable combination thereof.

The user-network contract (UNC) is typically defined at the UNI. The UNC usually indicates the QoS to which the user is entitled and also the specification of the traffic, which the user may inject into the network, along with supplementary data. The supplementary data may include, for example, the time of day during which the user has access to a particular service, etc. For instance, the UNC may specify that no more than 1% of the user-injected IP packets (or ATM cells) may be lost by the network and that the user may send in 10 Mbits during any one second through the UNI.

The CAC part of the bandwidth control algorithm may use the UNC information of multiple users to provide a basic means to control the number of simultaneously present users in the network, thereby ensuring that the admitted users receive the bandwidth required to provide the contracted QoS. The CAC algorithm represents a trade-off between blocking probabilities and the provided throughput; the more users that the CAC algorithm admits into the network (which reduces the blocking probability), the smaller the provided throughput per user becomes because a greater number of users will share the network bandwidth.

CAC may be realized by means of the classical signaling exchange known for example form conventional communication circuit-switched networks. However, if the majority of the elastic flows in the network are short, such as for many TCP flows on the Internet today, the introduction of classical sign exchange to perform admission control may result in large overheads. Therefore, an on-the-fly decision to accept or discard the first packet of a flow as suggested in reference [3] would be more beneficial. For this reason, a mechanism based for example on the existing Resource Reservation Protocol (RSVP) is provided for keeping track of the identities of currently active flows, and for classifying packets according to these identities as and when they arrive. To determine whether a flow is new or not, it is sufficient to compare its identifier with that of the flows on a special list of active flows. If no packet was received for a certain flow within a given time-out period, the flow would be removed from the list of active flows. Admission control is preferably realized by determining a maximum number of admissible flows based on the prevailing traffic situation in the system, and setting the size of the list of active flows accordingly. If the list is full, a new flow will be rejected. Otherwise, the flow will be accepted and entered into the list.

Link Capacity Sharing Algorithm—the IP Network Example

In the following, a link capacity sharing algorithm according to a preferred embodiment will be described with reference to the particular application of an IP based network carrying rigid as well as elastic traffic.

First, a proper call-level traffic model needs to be formulated. Unfortunately, the application of the classical multirate call-level models for management of elastic traffic, such as best effort traffic in IP networks or ABR traffic in ATM networks, is everything but straightforward. For example, it is not possible to associate elastic traffic with a constant bandwidth. Instead, the bandwidth occupied by elastic traffic flows fluctuates in time depending on the current load on the link and the scheduling and rate control algorithms applied in the network nodes. The notion of blocking, when applied to elastic traffic flows, is not as straightforward as for rigid traffic, because an arriving elastic flow might get into service even if at the arrival instant there is no bandwidth available. Besides, for many services, the actual residency time of an elastic flow depends on the throughput actually received by the elastic flow.

Multi-class Model of a Transmission Link for Mixed Rigid-elastic Traffic

In the following, an example of a feasible Markovian model of a transmission link serving both peak-bandwidth assured (rigid or non-elastic) and elastic traffic classes is formulated. For simplicity and clarity, only a single rigid traffic class and two elastic traffic classes are considered. It should be noted that the model as well as the accompanying link sharing algorithm can be extended to more general cases, and of course even simpler cases.

The system under consideration comprises a transmission link of capacity C, which by way of example can be regarded as an integer number in some suitable bandwidth unit, say Mbps. In this example, calls arriving at the link generally belong to one of the following three traffic classes:

Class 1—Rigid traffic class flows, characterized by their peak bandwidth requirement $b_1$, flow arrival rate $\lambda_1$ and departure rate $\mu_1$.

Class 2—Adaptive elastic class flows, characterized by their peak bandwidth requirement $b_2$, minimum bandwidth requirement $b_2^{min}$, flow arrival rate $\lambda_2$ and departure rate $\mu_2$. Although the bandwidth occupied by adaptive elastic flows may fluctuate as a function of the link load, their actual holding time is not influenced by the received throughput throughout their residency in the system. This is the case for instance with an adaptive video codec, which, in case of throughput degradation decreases the quality of tie video images and thereby occupies less bandwidth.

Class 3—Non-adaptive elastic class flows, characterized by their peak bandwidth requirement $b_3$, minimum bandwidth requirement $b_3^{min}$, flow arrival rate $\lambda_3$ and ideal departure rate $\mu_3$. The ideal departure rate is experienced when the peak bandwidth is available. The real instantaneous departure rate is proportional to the bandwidth of the flows.

We denote the actual bandwidth allocated (reserved) to a flow of class-2 and class-3 in a given system state with $b_2^r$ and $b_3^r$, both of which vary in time as flows arrive and depart. We will also se the quantity $r_{min}=b_i^{min}/b_i$ (for i=2 or i=3) associated with elastic flows with minimum bandwidth requirements.

One may think of a non-adaptive elastic class flow as one that upon arrival has an associated amount of data to transmit (W) sampled from an exponentially distributed service requirement, with distribution $$G(x) = 1 - e^{-\frac{b_3}{\mu_3}x},$$

which in the case when the peak bandwidth $b_3$ is available during the entire duration of the flow gives rise to an exponentially distributed service time with mean $1/\mu_3$. Since the free capacity of the link fluctuates in time according to the instantaneous number of flows in service, the bandwidth given to the non-adaptive elastic flows may drop below the peak bandwidth requirement, in which case the actual holding time of the flow increases.

All three types of flows arrive according to independent Poisson processes, and the holding time for the rigid and adaptive flows are exponentially distributed. As we will see, the moments of the holding time of the nonadaptive flows can be determined using the theory of Markov reward processes. In short, two types of elastic traffic are considered. Elastic traffic is associated with both a peak and a minimum bandwidth requirement, and allowed into service only as long as the minimum bandwidth requirement is fulfilled. The two elastic traffic classes primarily differ in terms of how their residency time depends on the acquired throughput.

To ensure a given QoS of the different elastic classes (that, in general, differ in their peak and minimum bandwidth, i.e. $b_2 \neq b_3$, $b_2^{min} \neq b_3^{min}$) we need to establish some policy, which generally governs the bandwidth sharing among the different elastic classes. For this reason, we define the following general bandwidth sharing rules between the elastic classes. The following presentation concerns only two elastic classes, but it extends naturally to more than two elastic classes.

- If there is enough bandwidth for all flows to get their respective peak bandwidth demands, then class-2 and class-3 flows occupy $b_2$ and $b_3$ bandwidth units, respectively.
- If there is a need for bandwidth compression, i.e. $n_1 \cdot b_1 + n_2 \cdot b_2 + n_3 \cdot b_3 > C$, then the bandwidth compression of the elastic flows is such that $r_2 = r_3$, where $r_2 = b_2^r/b_2$ and, $r_3 = b_3^r/b_3$, as long as the minimum rate constraint is met for both elastic classes (i.e. $b_2^{min}/b_2 \leq r_2 \leq 1$ and $b_3^{min}/b_3 \leq r_3 \leq 1$).
- If there is still need for farther bandwidth compression, but either one of the two elastic classes does not tolerate further bandwidth decrease (i.e. $r_i$ is already $b_i^{min}/b_i$ for either i=2 or i=3) at the time of the arrival of a new flow, then the service class which tolerates further compression decreases equally the bandwidth occupied by its flows, as long as the minimum bandwidth constraint is kept for this traffic class.

Three underlying assumptions of the above exemplary model are noteworthy. First of all, it is assumed that both types of elastic flows are greedy, in the sense that they always occupy the maximum possible bandwidth on the link, which is the smaller of their peak bandwidth requirement ($b_2$ and $b_3$, respectively) and the equal share (in the above sense) of the bandwidth left for elastic flows by the rigid flows (which will depend on the link allocation policy used). Second, it is assumed that all elastic flows in progress share proportionally equally (i.e. the $r_i$'s are equal) the available bandwidth among themselves, i.e. the newly arrived elastic flow and the in-progress elastic flows will be squeezed to the same $r_j$ value. This assumption, as we will see, provides a quite "fair" resource sharing among the elastic flows. To have different elastic traffic classes with significantly different QoS this assumption needs to be modified. If a newly arriving flow decreased the elastic flow bandwidth below $b_2^{min}$ and $b_3^{min}$ (i.e. both elastic classes are compressed to their respective minima), that flow is not admitted into the system, but it is blocked and lost. Arriving rigid as well as elastic flows are allowed to "compress" the in-service elastic flows, as long as the minimum bandwidth constraints are kept. As a third point, the model assumes that the rate control of the elastic flows in progress is ideal, in the sense that an infinitesimal amount of time after any system state change (i.e. flow arrival and departure) the elastic traffic sources readjust their current bandwidth on the link. While this is clearly an idealizing assumption, the buffers at the IP packet layer could be made large enough to absorb the IP packets until TCP throttles the senders. The fact that the model assumes immediate source rate increase whenever possible make the forthcoming throughput and blocking calculations conservative rather than optimistic.

It is intuitively clear that the residency time of the non-adaptive elastic flows in this system depends not only on the amount of data they want to transmit, but also on the bandwidth they receive during their holding times, and vice versa, the amount of data transmitted through an adaptive elastic flow depends on the received bandwidth. In order to specify this relationship we define the following quantities:

$\theta_2(t)$ and $\theta_3(t)$ defines the instantaneous throughput of adaptive and non-adaptive flows, respectively, at time t. For example, if there are $n_1$, $n_2$ and $n_3$ rigid, adaptive, and non-adaptive flows, respectively, in the system at time t, the instantaneous throughputs for adaptive and non-adaptive flows are $\min(b_2, (C-n_1 b_1 - n_3 r_3 b_3)/n_2)$ and $\min(b_3, (C-n_1 b_1 - n_2 r_2 b_2)/n_3)$, respectively. Note that $\theta_2(t)$ and $\theta_3(t)$ are discrete random variables for any $t \geq 0$.

$$\tilde{\theta}_t = \frac{1}{t}\int_0^t \theta_2(\tau)\,d\tau$$

defines the throughput of an adaptive flow having a holding time equal to t.

$\theta = \int_0^\infty \theta_\tau dF(\tau) = \mu_2 \int_0^\infty \theta_\tau e^{-\mu_2 \tau} d\tau$ (random variable) defines the throughput of an adaptive flow, where $F(t)$ is the exponentially distributed holding time.

$T_x = \inf\{t | \int_0^t \theta_3(\tau) d\tau \geq x\}$ (random variable) gives the time it takes for the system to transmit x amount of data through an elastic non-adaptive flow.

$\hat{\theta} = x/T_x$ defines the throughput of an non-adaptive flow during the transmission of x data units. Note that $\theta_x$ is a continuous random variable.

$\hat{\theta}\int_0^\infty \hat{\theta}_x dG(x) = \mu_3/b_3 \int_0^\infty \hat{\theta}_x e^{-x\mu_3/b_3} dx$ (random variable) defines the throughput of an non-adaptive flow, where the amount of transmitted data is exponentially distributed with parameter $\mu_3/b_3$.

Although a number of general bandwidth sharing rules have been defined above, a more specific link capacity sharing policy, especially one that considers the diverse requirements of rigid and elastic traffic, still needs to be presented.

Link Capacity Sharing Algorithm

According to the invention, the Partial Overlap (POL) link allocation policy, known from reference [7] describing the POL policy for simulative analysis in the classical multi-rate circuit switched framework, is adopted and modified for a traffic environment that includes elastic traffic. According to the new so called elastic POL policy, the link capacity C is divided into two parts, a common part $C_{COM}$ for rigid as well as elastic traffic and a dedicated part $C_{ELA}$, which is reserved for the elastic flows only, such that $C=C_{COM}+C_{ELA}$.

Furthermore, admission control parameters, one for each elastic traffic class present in the system, are introduced into the new elastic POL policy. In this particular example, $N_{EL2}$ denotes the admission control parameter for adaptive elastic flows and $N_{EL3}$ denotes the admission control parameter for non-adaptive elastic flows. Each admission control parameter stands for the maximum number of admissible flows of the corresponding elastic traffic class. The admission control parameters are also referred to as cut-off parameters, since as long as the maximum number of simultaneous elastic flows of a certain class are present on the link, new elastic flows will be rejected, a form of cut-off.

Under the considered elastic POL policy, the number ($n_1$, $n_2$, $n_3$) of flows in progress on the link is subject to the following constraints:

$$n_1 \cdot b_1 \leq C_{COM} \quad (1)$$

$$N_{EL2} \cdot b_2^{min} + N_{EL3} \cdot b_3^{min} \leq C_{ELA} \quad (2)$$

$$n_2 \leq N_{EL2} \quad (3)$$

$$n_3 \leq N_{EL3} \quad (4)$$

In (1) the elastic flows are protected from rigid flows. In (2–4) the maximum number of elastic flows is limited by three constraints. Expression (2) protects rigid flows from elastic flows, while (3–4) protect the in-progress elastic flows from arriving elastic flows. The new elastic POL policy is fully determined by the division of the link capacity, specified by $C_{COM}$, and the admission control parameters $N_{EL2}$, $N_{EL3}$. These parameters are referred to as the output parameters of the system. The performance of the elastic POL policy can be tuned by the output parameters, and in particular, it has been realized that the setting of the output parameters $C_{COM}$, $N_{EL2}$ and $N_{EL3}$, allows for a tuning of the throughput-to-blocking trade-off for the elastic traffic classes.

With respect to the throughput-to-blocking trade-off for elastic traffic, the invention is generally directed towards the provision of a high link bandwidth utilization under one or more call-level constraints that are related to at least one of elastic throughput and elastic blocking probability.

According to a preferred embodiment of the invention, the link capacity sharing algorithm aims at setting the output parameters of the elastic POL policy in such a way as to minimize call blocking probabilities $B_2$ and $B_3$ for elastic flows, while being able to take into account a blocking probability constraint (GoS) for the rigid flows as well as minimum throughput constraints for the elastic flows. The throughput constraints for the elastic flows are introduced because it has been recognized that there is a minimum acceptable throughput below which the users gain no actual positive utility.

Therefore, the rigid traffic class is associated with a maximum accepted call blocking probability $B_1^{max}$, and the elastic adaptive and elastic non-adaptive traffic classes are associated with minimum accepted throughputs $\theta_{min}$ and $\hat{\theta}_{min}$, respectively. Preferably, the throughput constraints are formed as constraints on the probability that the user-perceived throughput during transfer of certain amount of data drops below a given threshold. Such a performance measure is easier for the user to verify than the traditional fairness criteria discussed in references [1–3].

Although the blocking probabilities for elastic traffic are being minimized, it is nevertheless normally advisable, although not necessary, to have a worst-case guarantee of the call blocking for elastic traffic, and associate also the two elastic traffic classes with maximum allowed block probabilities $B_2^{max}$ and $B_3^{max}$.

In this case, the traffic input parameters of the system are the set of arrival rates ($\lambda_1, \lambda_2, \lambda_3$) and departure rates ($\mu_1, \mu_2, \mu_3$) obtained from the network, the bandwidths ($b_1, b_2, b_3$), the minimum elastic bandwidth demands ($b_2^{min}, b_3^{min}$), the blocking probability constraints ($B_1^{max}$ or the whole set of $B_1^{max}$, $B_2^{max}$ and $B_3^{max}$) and the elastic throughput constraints ($\theta_{min}$ and $\hat{\theta}_{min}$) The departure rate for non-adaptive class can be estimated under the assumption that the bandwidth of the non-adaptive flows equals $b_3$.

The parameters and performance measures associated with the rigid traffic class and the two elastic traffic classes are summarized in Table I below.

TABLE I

| | Input parameters | | | | | | Performance measures | | System state Number of flows |
|---|---|---|---|---|---|---|---|---|---|
| Class ⇓ | Call arrival rate | Departure rate | Peak bandwidth requirement | Minimum bandwidth requirement | Maximum accepted blocking probability | Minimum accepted throughout | Blocking | Throughput | in the system |
| Rigid | $\lambda_1$ | $\mu_1$ | $b_1$ | — | $B_1^{max}$ | — | $B_1$ | — | $n_1$ |
| Adaptive elasic | $\lambda_2$ | $\mu_2$ | $b_2$ | $b_2^{min}$ | $(B_2^{max})$ | $\theta_{min}$ | $B_2$ | $\bar{\theta}$ | $n_2$ |
| Non-adaptive elastic | $\lambda_3$ | $\mu_3$ | $b_3$ | $b_3^{min}$ | $(B_3^{max})$ | $\hat{\theta}_{min}$ | $B_3$ | $\hat{\theta}$ | $n_3$ |

Figure 2:
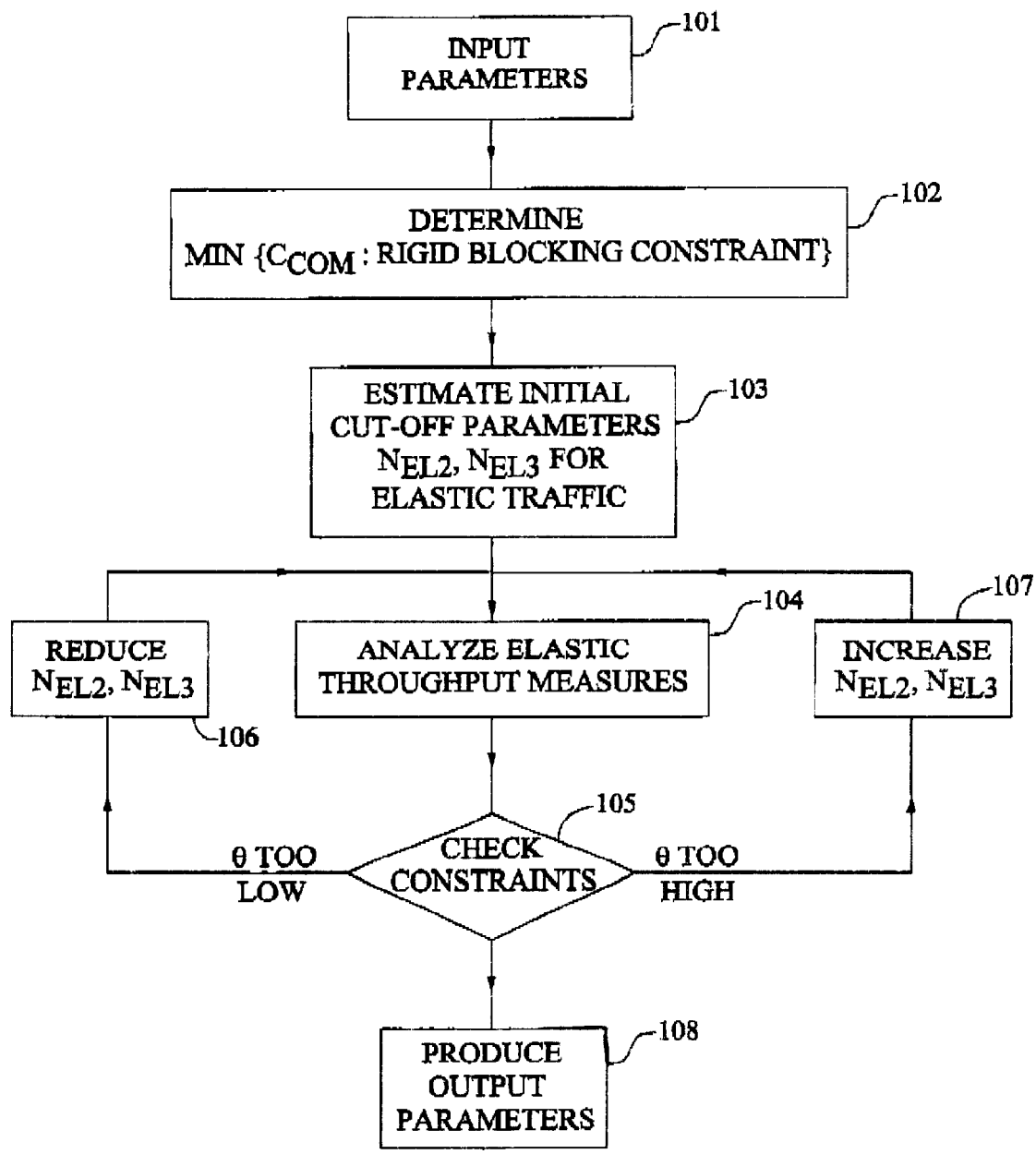
FIG. 2 is a schematic flow diagram of the overall link capacity sharing algorithm applied in a mixed rigid-elastic IP traffic environment according to a preferred embodiment of the invention.

The problem of determining the output parameters of the elastic POL policy under blocking and throughput constraints is outlined below with reference to FIG. 2, which is a schematic flow diagram of the overall link capacity sharing algorithm according to a preferred embodiment of the invention. In the first step 101, the required input parameters, such as current arrival and departure rates, bandwidth requirements as well as the constraints imposed on the traffic, are provided. In step 102, the GoS (call blocking) requirement for rigid traffic is guaranteed by the proper setting of $C_{COM}$. In particular, we determine the minimum required capacity of $C_{COM}$ for rigid flows that guarantees the reed blocking probability $B_1^{max}$:

$$\min\{C_{COM}: B_1 \leq B_1^{max}\} \quad (5)$$

where $B_1$ is the blocking probability of rigid flows. For example, the well-known Erlang-B formula can be used to estimate such a value of $C_{COM}$ based on arrival and departure rates and peak bandwidth requirement for the rigid traffic as inputs. In addition, a maximum number $N_{COM}$ of admissible rigid flows can be determined based on the Erlang-B analysis and used for admission control of the rigid traffic.

Next, we have to determine a maximum number of elastic flows ($N_{EL2}$, $N_{EL3}$) that can be simultaneously present in the system at the same time as the required throughput and blocking requirements are fulfilled. It is intuitively clear that if the maximum number $N_{EL2}$ of adaptive elastic flows is increased, the blocking probability $B_2$ of adaptive elastic flows decreases and the throughput decreases as well. Unfortunately, changing $N_{EL2}$ affects both the blocking probability $B_3$ and throughput of non-adaptive elastic flows and vice-versa.

In this particular embodiment, the link capacity sharing algorithm a at minimizing the blocking probabilities of the elastic traffic classes under throughput-threshold constants. To accomplish this, the invention proposes an iterative procedure, generally defined by steps 103–107, for tuning the cut-off parameters so that the throughput-threshold constraints are just fulfilled, no more and no less. First, in step 103, initial values of the cut-off parameters are estimated. Next, the performance of the system is analyzed (step 104) with respect to elastic throughputs. In particular, the throughputs $\theta$ and $\hat{\theta}$ offered in the system controlled by the initial values of the cut-off parameters are analyzed (step 104) and related (step 105) to the throughput-threshold constraints $\theta_{min}$ and $\hat{\theta}_{min}$. If the offered throughputs are too low, then the cut-off parameters are reduced (step 106), increasing the blocking probabilities and also increasing the throughputs. On the other hand, if the offered throughputs are higher than the throughput-thresholds, then the cut-off parameters can be increased (step 107) so that the blocking probabilities (as well as the throughputs) are reduced. In this way, by iteratively reputing the steps 104, 105 and 106/107, the blocking probabilities can be reduced to a minimum, while still adhering to the throughput constraints. Once the constraints are fulfilled to a satisfactory degree, the algorithm outputs (step 108) the parameters $C_{COM}$, ($C_{ELA}$), ($N_{COM}$), $N_{EL2}$, $N_{EL3}$ for use in controlling the actual bandwidth sharing of the considered transmission link.

Naturally, the steps 101 to 108 are repeated in response to changing traffic conditions so as to flexibly adapt the bandwidth sharing to the prevailing traffic situation.

In general, the cut-off parameters have to be reduced to fulfill the throughput constrain. On the other hand, as the aim is to minimize the elastic blocking probabilities, and as it is advisable to have a worst-case guarantee of the blocking probabilities for elastic traffic, the cut-off parameters must at the same time be as high as possible, and at least high enough to fulfill the worst-case blocking constraints. Depending on the model parameters and the given bounds, it may be the case that all the constraints can not be satisfied at the same time, which means that the link is overloaded with respect to the GoS requirements.

Figure 3:
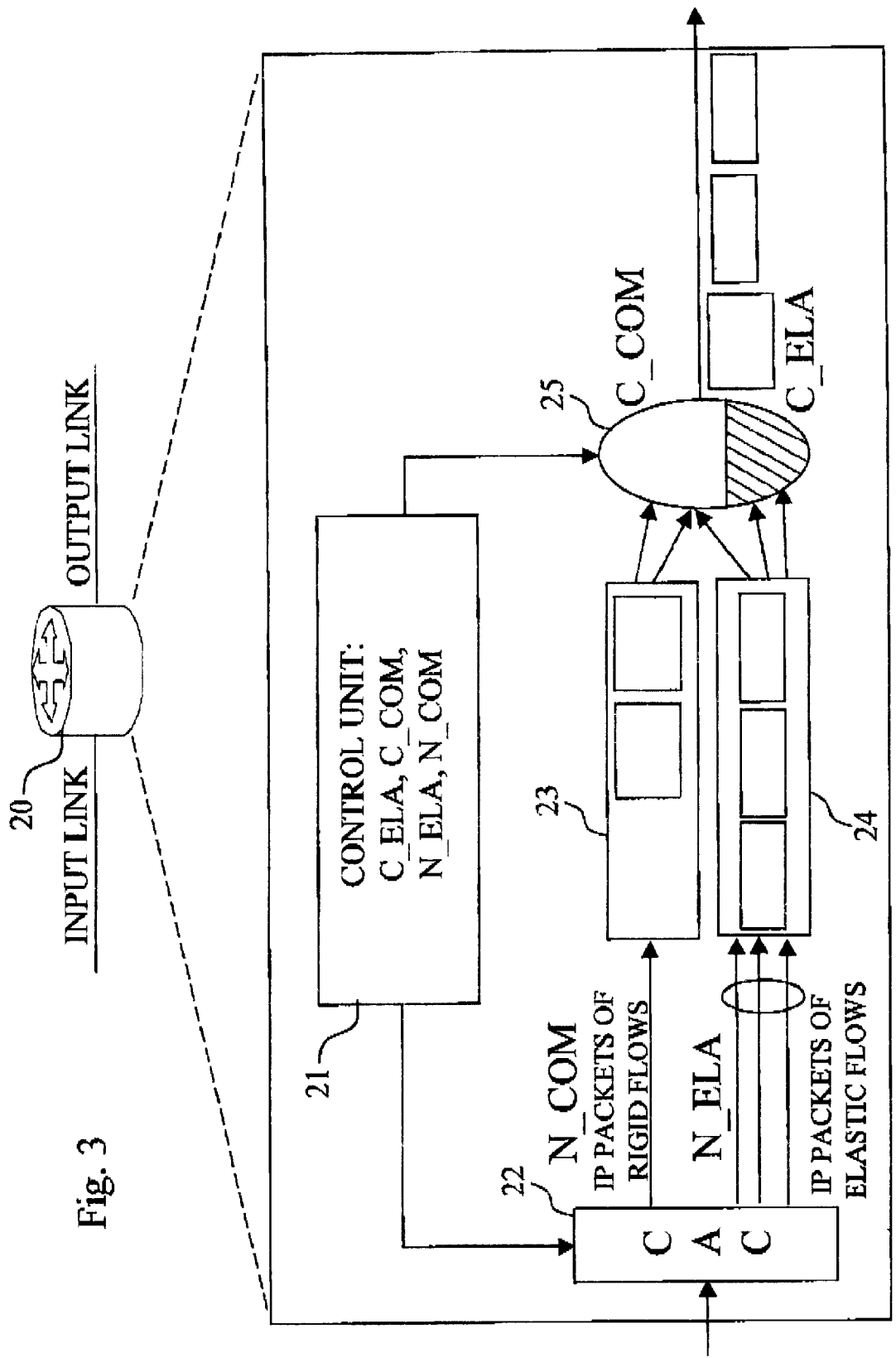
FIG. 3 is a schematic block diagram of pertinent parts of an IP router according to a preferred embodiment of the invention.

FIG. 3 is a schematic block diagram of pertinent parts of an IP router (or an ATM switch) in which a link capacity sharing algorithm according to the invention is implemented. The IP router 20 is associated with an input link and an output link. The router 20 has a control unit 21, a CAC unit 22, an output port buffer 23 for rigid traffic, an output port buffer 24 for elastic traffic, and an output port scheduler 25.

The control unit 21 is preferably, although not necessarily, realized as software on a computer system. The software may be written in almost any type of computer age, such as C, C++, Java or even specialized proprietary languages. In effect, the link capacity algorithm is mapped into a software program, which when executed on the computer system produces a set of output control parameters C_ELA, C_COM, N_ELA, N_COM in response to appropriate traffic input parameters received from the network and the UNCs by conventional means.

The N_ELA, N_COM parameters represents the cut-off parameters for rigid traffic and elastic traffic, respectively. In the example of FIG. 3, only a single elastic traffic class is considered, and hence only a single cut-off parameter N_ELA for elastic traffic is produced by the control unit 21. The cut-off parameters are forwarded to the CAC unit 22, which accepts or rejects new flows based on the forwarded cut-off parameters. For each requested new flow, the traffic class of the flow is determined so that admission control can be exercised based on the relevant cut-off parameter. IP packets belonging to accepted rigid flows (restricted by N_COM) are forwarded to the output port buffer 23 for subsequent scheduling by the output port scheduler 25. In the same way, IP packets belonging to accepted elastic flows (restricted by N_ELA) are forwarded to the output port buffer 24.

The C_ELA, C_COM parameters are forwarded from the control unit 21 to the output port scheduler 25. The output port scheduler 25 represents the bandwidth of the output link, and the actual bandwidth representation used in the traffic scheduling is determined by die C_ELA, C_COM parameters. In the output port scheduler 25, the bandwidth of the output link is divided into a common part C_COM, and a dedicated part C_ELA reserved for elastic traffic only. In scheduling IP packets, the output port scheduler 25 can use only the common bandwidth part C_COM for IP packets from the output port buffer 23 for rigid flows. For IP packets from the output port buffer 24 for elastic flows on the other hand, the scheduler 25 can use both the dedicated bandwidth part C_ELA and the common bandwidth part C_COM. In this way, the output port output port scheduler 25 decides how many IP packets that can be sent on the output link per time unit and traffic class.

Analysis of Throughput and Blocking Probability Measures of Elastic Flows

The throughput constraints used in the evaluation step 105 (FIG. 2) may for example be constraints on the average throughput, where the cut-off parameters fulfills the throughput constraints if:

$$E(\theta) \geq \theta_{min}, E(\hat{\theta}) \geq \hat{\theta}_{min} \qquad (6)$$

where E stands for the expected value. To make a plausible interpretation of this type of constraints, let us assume that the distribution of $\theta$ is fairly symmetric around $E(\theta)$. In other words, the median of $\theta$ is close to $E(\theta)$. In this case, the probability that an elastic flow obtains less bandwidth than $\theta^{min}$ is around 0.5.

However, users often prefers more informative throughput constraints, and an alternative constraint may require that the throughput of adaptive and non-adaptive flows are greater than $\theta_{min}$ and $\hat{\theta}_{min}$ with predetermined probabilities $(1-\epsilon_2)$ and $(1-\epsilon_3)$, respectively, independent of the associated service requirements (x) or holding times (t):

$$Pr(\theta_t \geq \theta_{min}) \geq (1-\epsilon_2), Pr(\hat{\theta}_x \geq \hat{\theta}_{min}) \geq (1-\epsilon_3) \qquad (7)$$

The worst-case constraints on the elastic blocking probabilities can simply be expressed as:

$$B_2 \leq B_2^{max}, B_3 \leq B_3^{max} \qquad (8)$$

In order to obtain the elastic throughput measures (step 104) and possibly also the elastic blocking me s for given values of the cut-off parameters so as to enable evaluation (step 105) against the given constraints, the steady state distribution of a Markov chain describing the dynamics of the mixed rigid-elastic traffic needs to be determined. As implied in connection with the formulation of the multi-class model above, the system under investigation can be represented as a Continuous Time Markov Chain (CTMC), the state of which is uniquely characterized by the number of flows of the different traffic classes ($n_1$, $n_2$, $n_3$). It is clear that in order to obtain the perforce measures of the system we have to determine the CTMC's generator matrix Q and its steady state distribution $\underline{P}=\{P_i\}$, where $\underline{P}^T \cdot Q = \underline{0}$ and $\Sigma_i P_i = 1$. The notions of a generator matrix and a steady state distribution of a Markov chain are considered well known to the skilled person. For a general introduction to loss networks, Markov theory and the general stochastic knapsack problem, reference is made to [8], and especially pages 1–69 thereof. For given values of the parameters $C_{COM}$, $N_{EL2}$, $N_{EL3}$, the set of triples ($n_1$, $n_2$, $n_3$) that satisfies the constraints of the elastic POL policy given by (1–4) constitute the set of feasible states of the system denoted by S. The cardinality of the state space can be determined as:

$$\#S = \left(\frac{C_{COM}}{b_1} + 1\right) \cdot (N_{EL2} + 1) \cdot (N_{EL3} + 1) \quad (9)$$

It is easy to realize that the generator matrix Q possesses a nice structure, because only transitions between "neighboring states" are allowed in the following sense. Let $q_{ij}$ denote the transition rate from state i to state j. Then, taking into account the constraints (1–4) on the number of flows in the system defined by the elastic POL policy, the non-zero transition rates between the states are:

$$q_{i,i_{k+}} = \lambda_k \ k=1, 2, 3 \quad (10)$$

$$q_{i,i_{k-}} = n_k \cdot \mu_k \ k=1, 2 \quad (11)$$

$$q_{i,i_{3-}} = n_3 \cdot r_3 \cdot \mu_3 \quad (12)$$

where $i_{1+} = (n_1+1, n_2, n_3)$ when $i=(n_1, n_2, n_3)$; $i_{k+}$ and $i_{k-}$ ($k=1, 2, 3$) are defined similarly. Expression (10) represents the state transitions due to a call arrival, while (11) and (12) represent transitions due to call departures. The quantity defined in (12) denotes the total bandwidth of the non-adaptive flows when the system is in state i. The generator matrix Q of the CTMC is constructed based on the transition rates defined in (10–12).

Figure 4:
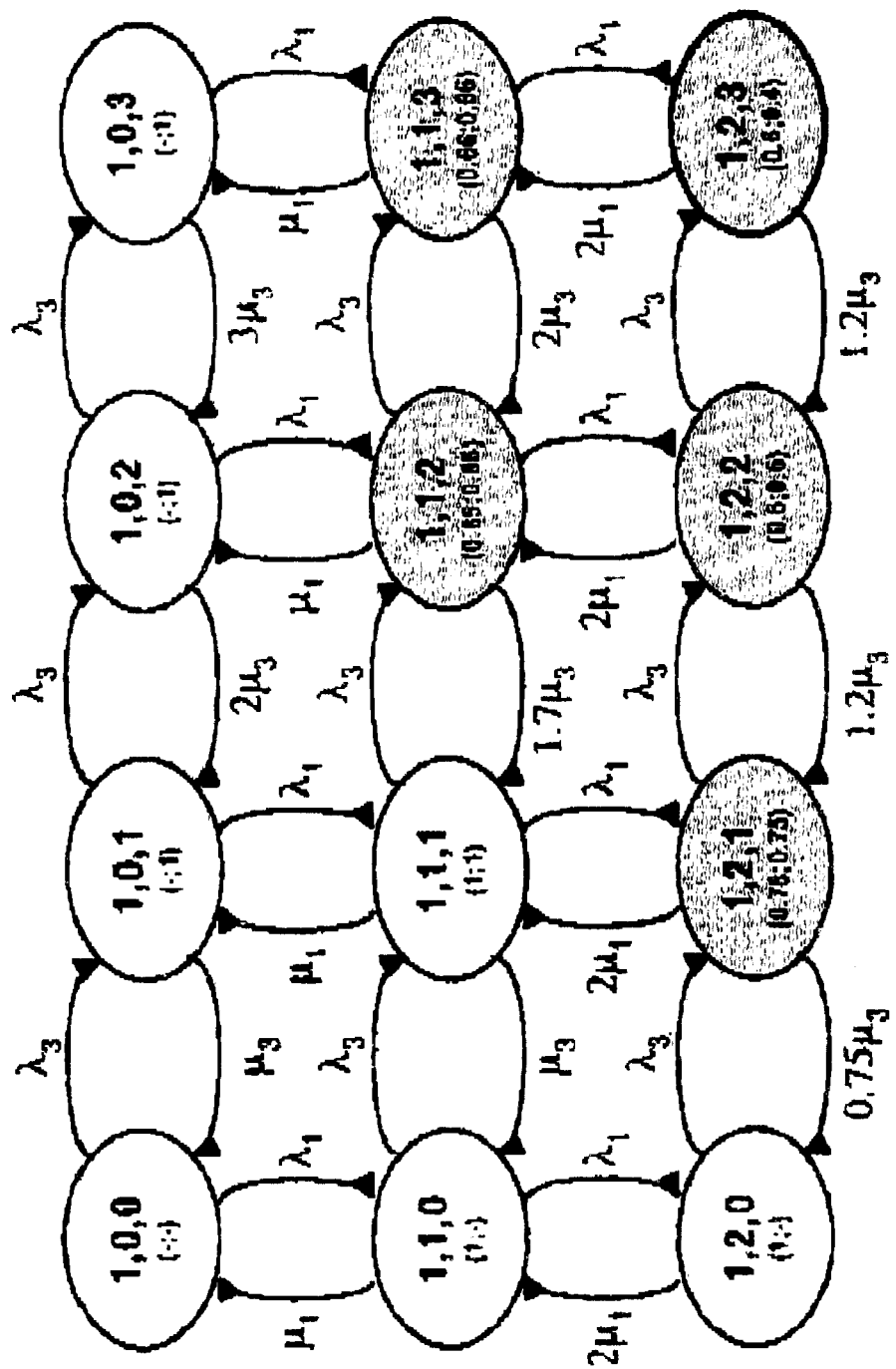
FIG. 4 is a Markov chain state space diagram for an illustrative transmission link system.

For illustrative purposes, let us consider a small system with a rigid class, an adaptive elastic class and a non-adaptive elastic class, where the link capacity C=7. For simplicity, assume a division of the link capacity such that $n_1=1$ is kept fixed, i.e. the available bandwidth for elastic flows is 6 bandwidth units. Furthermore, $b_1=1$, $b_2=3$ and $b_3=2$. The elastic flows are characterized by their minimum accepted bandwidths, which here are set to $b_2^{min}=1.8$ and $b_3^{min}=0.8$. Setting the cut-off parameters to $N_{EL2}=2$ and $N_{EL3}=3$, gives rise to 12 feasible states as illustrated in the Markov chain state space diagram of FIG. 4. There are 5 (gray) states where at least one of the elastic flows is compressed below the peak bandwidth specified by $b_2$ and $b_3$. The states are identified by the number of active connections ($n_1$, $n_2$, $n_3$). The values below the state identifiers indicate the bandwidth compression of the adaptive and non-adaptive elastic traffic ($r_2$, $r_3$). The state (1, 2, 3) is the only one where the bandwidth compression of the adaptive class and the non-adaptive class differs due to different minimum bandwidth requirements ($r_2^{min}=0.6$, $r_3^{min}=0.4$).

Different numerical solutions can be used to obtain the steady state distribution of a so-called multidimensional Markov chain. Direct methods such as the Gaussian elimination method compute the solution in a fixed number of operations. However, when considering the size of the state space for practically interesting cases, i.e. large state spaces in the order of $10^4$ or higher, the computational complexity of the direct methods is usually unacceptable. Therefore, an iterative method, such as the biconjugate gradient method applied here, is much more feasible for the steady state analysis. The biconjugate gradient method is also detailed in reference [9].

The computation time of an iterative method depends on factors such as the speed of convergence and the complexity of each iteration step. The computation time is also highly dependent on the initial guess. A good initial guess will significantly reduce the overall computation time. For this reason, according to the invention, a heuristic direct method is applied for calculating a fairly close initial guess to be applied in the iterative method. Some special multidimensional Markov chains exhibit a so called product form solution, which means that the steady state probability of state (i,j) can be efficiently determined in product form as $f(i) \cdot g(j)$ instead of $h(i,j)$. Unfortunately, due to the occasional reduction of the bandwidth (and corresponding departure rate) of the non-adaptive elastic flows, the CTMC of the studied system does not exhibit the nice properties of reversibility and product form solution, but the proposed initial guess used for the subsequent iterative numerical procedure is calculated as if the Markov chain exhibited product form. In other words, the initial form of the steady state distribution of a Markov chain describing a traffic system that includes non-adaptive elastic traffic is determined based on Markov chain product form calculations, and applied in an iterative steady state analysis method.

The fact that only non-adaptive elastic flows disturb the reversibility is utilized, and the Markov chain that describes the number of rigid and adaptive elastic flows in the system is reversible, and $$p(n_1, n_2) = \sum_{i=0}^{N_{EL3}} p(n_1, n_2, i), \ \forall \ (n_1, n_2) \in S$$

is obtained from:

$$p^*(0, 0) = 1 \quad (13)$$

$$p^*(n_1, n_2) = p^*(n_1-1, n_2) \cdot \frac{\lambda_1}{n_1 \cdot \mu_1} = p^*(n_1, n_2-1) \cdot \frac{\lambda_2}{n_2 \cdot \mu_2} \quad (14)$$

$$p(n_1, n_2) = \frac{p^*(n_1, n_2)}{\sum_{(a,b) \in S} p^*(a, b)} \quad (15)$$

where the $p^*(n_1, n_2)$ unnormalized steady state probabilities are auxiliary variables of the iterative method. From the steady state distribution of the rigid and adaptive flows ($p(n_1, n_2)$), the overall steady state behavior ($p(n_1, n_2, n_3)$) is obtained by fixing the number of rigid flows ($n_i = i$) and assuming that the obtained Markov chain is reversible, even though this is not the case. This assumption allows us to evaluate an initial guess for the iterative method as follows. For all possible fixed values of $n_1$ ($n_1 = i$):

$$p^*(i, 0, 0) = 1 \quad (16)$$

$$p^*(i, n_2, n_3) = \frac{p^*(i, n_2-1, n_3) \cdot \lambda_2 + p^*(i, n_2, n_3-1) \cdot \lambda_3}{n_2 \cdot \mu_2 + n_3 \cdot \mu_3 \cdot r_3} \quad (17)$$

$$p(i, n_1, n_2) = p^*(i, n_1, n_2) \frac{\sum_{a \in S} p^*(i, a)}{\sum_{(a,b) \in S} p^*(i, a, b)} \quad (18)$$

In other words, we group states with common $n_1$, $n_2$ parameters, summing up their probabilities, to obtain a new 2-dimensional Markov chain. The obtained 2-dimensional Markov chain exhibits product form, and its steady state distribution is calculated using equations (13–15). Next, we "share" the probability of the state groups among the individual states that define a state group using equations (16–18).

The steady state distribution of traffic classes other than the non-adaptive traffic class is calculated as if there was no non-adaptive traffic in the system, and then state probabilities are calculated under the assumption of equilibrium between incoming and outgoing traffic of one of the other traffic classes and the non-adaptive elastic traffic class. In the present example, the steady state distribution of the rigid traffic class and the adaptive elastic traffic class is calculated as if there was no non-adaptive elastic traffic in the system, and state probabilities are determined assuming that the incoming and outgoing adaptive and non-adaptive elastic traffic are in equilibrium. It should though be understood that equations (13–18) can be adapted to a variety of applications, for example traffic systems with several rigid traffic classes but only a single elastic traffic class.

It should also be understood that the above procedure for calculating an initial approximation of a steady state distribution is generally applicable to any multi-dimensional Markov chain and can be adapted to different applications, The obtained initial approximation of the steady state distribution is used as a good initial guess for an iterative method, such as the biconjugate gradient based method, which improves the initial guess step-by-step to an appropriate accuracy.

Based on the steady state distribution of the CTMC, the call blocking probabilities can be calculated as:

$$B_k = \sum_{j \in S, ik + \notin S} p_j, k = 1, 2, 3 \quad (19)$$

The calculation of the average throughput of the adaptive and non-adaptive elastic flows is also quite straightforward once the steady state distribution of the CTMC is determined:

$$E(\tilde{\theta}) = \frac{\sum_{(n_1,n_2,n_3) \in S} n_2 p(n_1, n_2, n_3) b_2 r_2(n_1, n_2, n_3)}{\sum_{(n_1,n_2,n_3) \in S} n_2 p(n_1, n_2, n_3)} \quad (20)$$

$$E(\tilde{\theta}) = \frac{\sum_{(n_1,n_2,n_3) \in S} n_3 p(n_1, n_2, n_3) b_3 r_3(n_1, n_2, n_3)}{\sum_{(n_1,n_2,n_3) \in S} n_3 p(n_1, n_2, n_3)} \quad (21)$$

Thus, the blocking probability constraints in (5) and (8) as well as the average throughout constrains in (6) can be evaluated.

Unfortunately, it is much harder to check the throughput threshold constraints in (7), since neither the distribution nor the higher moments of $\theta_t$ and $\hat{\theta}_x$ can be analyzed based on the steady state distribution of the above studied Markov chain. Hence, a new analysis approach is applied. The throughput threshold constraint on adaptive elastic flows can be checked based on the distribution of $\theta_t$ and the throughput threshold constraint on non-adaptive elastic flows can be checked based on the distribution of $T_x$, because:

$$Pr(\hat{\theta}_x \geq \hat{\theta}_{min}) = Pr(x/T_x \geq \hat{\theta}_{min}) = Pr(T_x \leq x/\hat{\theta}_{min}) \quad (22)$$

Since it is computationally to hard to evaluate the distribution of $T_x$ and $\theta_t$ for realistic models, but there are effective numerical methods to obtain their moments, we check the throughput threshold constraint by applying a moment based distribution estimation method as disclosed in reference [10] and summarized in Table II below. In Table II, $\mu_n$ denotes the nth moment of the random variable X and the formulas present an upper and lower bound on the distribution of X. Table II is valid for any non-negative random variable, i.e. we do not utilize the fact that $T_x$ and $\theta_t$ are upper bounded in our system.

TABLE II

| | $Pr(X \geq 1) \leq$ upper limit | $Pr(X \geq 1) \leq$ upper limit |
|---|---|---|
| 1 | $\mu_1$ | 0 |
| 2 | $\frac{\mu_2 - \mu_1^2}{\mu_2 - 2\mu_1 + 1}, (\mu_1 \leq 1)$ | $\frac{(\mu_1 - 1)^2}{\mu_2 - 2\mu_1 + 1}, (\mu_1 \geq 1)$ |
| 3 | $\frac{\mu_3\mu_1 - \mu_2^2 + \mu_2\mu_1 - \mu_1^2}{\mu_3 - \mu_2},$ $\left(\frac{\mu_2 - \mu_3}{\mu_1 - \mu_2} \geq 1\right)$ $\frac{\mu_3\mu_1 - \mu_2^2}{\mu_3 - 2\mu_2 + \mu_1},$ $\left(\frac{\mu_2 - \mu_3}{\mu_1 - \mu_2} < 1\right)$ | $\frac{(\mu_2 - \mu_1)^3}{(\mu_3 - 2\mu_2 + \mu_1)(\mu_3 - \mu_2)},$ $\left(\frac{\mu_2 - \mu_3}{\mu_1 - \mu_2} \geq 1\right)$ |

The method to evaluate the moments of $T_x$ and $\theta_t$ is based on a tagging an elastic flow arriving to the system, and carefully exam the possible transitions from the instance this tagged flow enters the system until it leaves the system. The system behavior during the service of the tagged flow can be described by a slightly modified Markov chain. To analyze $\theta_t$ a tagged adaptive elastic flow is considered, while to analyze $T_x$ a tagged non-adaptive elastic flow is considered. The modified system used to evaluate $\theta_t$ (or $T_x$) has the following properties:

Since it is assumed that at least the tagged elastic flow is present in the system we exclude states where $n_2=0$ (or $n_3=0$).

With each state of the state space there is an associated entrance probability, which is the probability of the event that the modified CTMC starts from that state. When the tagged elastic flow finds the system in state $(n_1,n_2,n_3)$ it will bring the system into state $(n_1,n_2+1,n_3)$ (or state $(n_1,n_2,n_3-1)$) unless the state $(n_1,n_2,n_3)$ happens to be a blocking state of the tagged flow.

Let $\{Z(t), t \geq 0\}$ be the modified CTMC assuming the tagged elastic flow never leaves the system over the finite state space F with generator B. F can be defined as:

$$0 \leq n_1 \cdot b_1 \leq C_{COM} \quad (23)$$

$$1 \text{ (or } 0) \leq n_2 \leq N_{EL2} \quad (24)$$

$$0 \text{ (or } 1) \leq n_3 \leq N_{EL3} \quad (25)$$

Indeed, $F=S\backslash S_0$ where $S_0$ is the states in S where $n_2=0$ (or $n_3=0$). The state transition rates in B are closely related to the appropriate rates in Q.

$$b_{i,ik+} = \lambda_k \ k=1, 2, 3 \quad (26)$$

$$b_{i,i1-} = n_i \cdot \mu_1 \quad (27)$$

$$b_{i,i2-} = (n_2-1) \cdot \mu_2 \ (\text{or } n_2 \cdot \mu_2) \quad (28)$$

$$b_{i,i3-} = n_3 \cdot r_3 \cdot \mu_3 \ (\text{or } (n_3-1) \cdot r_3 \cdot \mu_3) \quad (29)$$

The initial probability of the modified Markov chain $p^+(n_1,n_2,n_3)$ is obtained by considering the system state immediately after the tagged flow joins the system in steady state. This means that the probability that the system is in state $(n_1,n_2,n_3)$ after the tagged flow's arrival is proportional to the steady state probability of state $(n_1,n_2-1,n_3)$ (or $(n_1,n_2,n_3-1)$). Consequently:

$$p^{2+}(n_1, n_2, n_3) = \frac{p(n_1, n_2 - 1, n_3)}{\sum_{i \in F} p(n_1, n_2, n_3)} \quad (30)$$

$$p^{3+}(n_1, n_2, n_3) = \frac{p(n_1, n_2, n_3 - 1)}{\sum_{i \in F} p(n_1, n_2, n_3)} \quad (31)$$

To obtain the moments of $\theta_t$, Markov Reward model is defined over $\{Z(t), t \geq 0\}$ in accordance with reference [11]. $\theta_t$ is a random variable which depends on the random arrival and departure of the rigid, adaptive and non-adaptive elastic flows as described by B. The reward rate associated we the states of the modified Markov chain represents the bandwidth of the tagged adaptive elastic flows in that state. Let $t_i$ be the reward rate (the bandwidth of the tagged adaptive elastic flow) in state i and T the diagonal matrix composed of the $t_i$ entries. $t_1 = r_2(i) \cdot b_2$, where $r_2(i)$ is the bandwidth compression in state i. In this way, the dynamics of the number of flows in the system during the service of the tagged flow is described by the Modified Markov chain, and the instantaneous bandwidth of the tagged flow is described by the instantaneous reward rate. If there are more flows in the system, the bandwidth of the tagged flow decreases towards $b_2^{min}$ and if there are less flows, it increases towards $b_2$. The generator matrix B and the reward matrix T define the Markov Reward model that accumulates $t \cdot \theta_t$ amounts of reward in the interval (0, t). This means that the reward accumulated in the interval (0, t) represents the amount of data transmitted through the tagged flow in this interval, and $\theta_t$ is the amount of transmitted data/t.

$T_x$ is the random amount of time that it takes to transmit x units of data through the tagged flow. By defining a Markov Reward model as above, the reward accumulated in the interval (0, t) represents the random amount of data transmitted through the tagged flow, and hence $T_x$ is the time it takes to accumulate x amounts of reward. This measure is commonly referred to as completion time.

Having the initial probability distribution $p^{2+}(n_1,n_2,n_3)$, and $p^{3+}(n_1,n_2,n_3)$, the generator matrix B and the reward matrix T, the numerical analysis method proposed in reference [11] is applied to evaluate the moments of $\theta_t$ and $T_x$. This numerical method is applicable for Markov Reward models with large state spaces ($\sim 10^6$ states).

Numerical Examples of the Application of the Link Capacity Sharing Algorithm

By way of example, consider a transmission link of capacity C=100 Mbps and supporting tree different service classes: rigid, adaptive elastic and non-adaptive service classes. The parameters, given as network traffic inputs and determined by the link sharing algorithm, of this system are as follows:

$C_{COM}$=20 Mbps, $C_{ELA}$=80 Mbps;
$b_1$=1 Mbps, $b_1$=5 Mbps, $b_3$=3 Mbps;
$\lambda_1 = \lambda_3 = 12$ 1/min;
$\mu_1 = \mu_2 = \mu_3 = 1$ 1/min;
$r_2^{min}$=0.05, $r_3^{min}$=0.001;
$N_{COM}$=20, $N_{EL2}$=20, $N_{EL3}$=20.

The effect of the arrival rate $\lambda_2$ of the adaptive elastic flows on the corresponding blocking probability for a number of values of minimum accepted throughput is demonstrated in Table III below.

TABLE III

| $\Pr(\tilde{\theta}_t \geq \tilde{\theta}_{min}) \geq (1-\epsilon_2)$ | $\lambda_2 = 12$ | $\lambda_2 = 14$ | $\lambda_2 = 16$ |
|---|---|---|---|
| $\tilde{\theta}_{min}$ = 2.6 | 89.4% | 83.6% | 77.7% |
| 3 | 84.2% | 75.1% | 65.5% |
| 3.4 | 74.4% | 62.0% | 50.8% |
| 3.8 | 64.3% | 47.8% | 34.9% |
| 4.2 | 42.5% | 23.4% | 10.5% |
| 4.6 | 4.8% | 0.14% | — |

As the minimum accepted throughput $\theta_{min}$ for the adaptive elastic traffic is assigned higher and higher values, the probability that an adaptive elastic flow obtains this throughput decreases. The increase of the arrival rate of the adaptive elastic flows results in more adaptive elastic flows in the system, and hence the throughput decreases together with the probability that the adaptive elastic flows obtain the required bandwidth.

The effect of the arrival rate $\lambda_3$ of the non-adaptive elastic flows on the corresponding blocking probability for a number of values of minimum accepted throughput is demonstrated in Table IV below. In this case, the system parameters are:

C=250 Mbps;
$C_{COM}$=50 Mbps, $C_{ELA}$=200 Mbps;
$b_1$=1 Mbps, $b_2$=3 Mbps, $b_3$=5 Mbps;
$\lambda_1$=40 1/min, $\lambda$=25 1/min;
$\mu_1 = \mu_2 = \mu_3 = 1$ 1/min;
$r_2^{min}$=0.4, $r_3^{min}$=0.05;
$N_{COM}$=50, $N_{EL2}$=120, $N_{EL3}$=180.

Note that in this case the modified Markov chain describing the system behavior during the service of a tagged non-adaptive elastic flow has 1,116,951 states and 6,627,100 transitions.

TABLE IV

| $\Pr(\tilde{\theta}_x \geq \tilde{\theta}_{min}) \geq (1-\epsilon_2)$ | $\lambda_3 = 20$ | $\lambda_3 = 25$ | $\lambda_3 = 30$ |
|---|---|---|---|
| $\tilde{\theta}_{min}$ = 2.5 | 99.98% | 99.6% | 88.1% |
| 3.33 | 99.8% | 94.36% | 32.5% |
| 4.0 | 97.4% | 68.1% | 13.8% |
| 4.34 | 91.5% | 59.8% | — |
| 4.54 | 89.6% | 52.3% | — |
| 4.76 | 86.0% | 30.9% | — |

In similarity to the effects demonstrated in Table III, as the minimum accepted throughput for the non-adaptive elastic traffic is assigned higher and higher values, the probability that a non-adaptive elastic flow obtains this throughput decreases. Also, the increase of the arrival rate results in a decreasing probability that the non-adaptive elastic flows obtain the required bandwidth.

Figure 5:
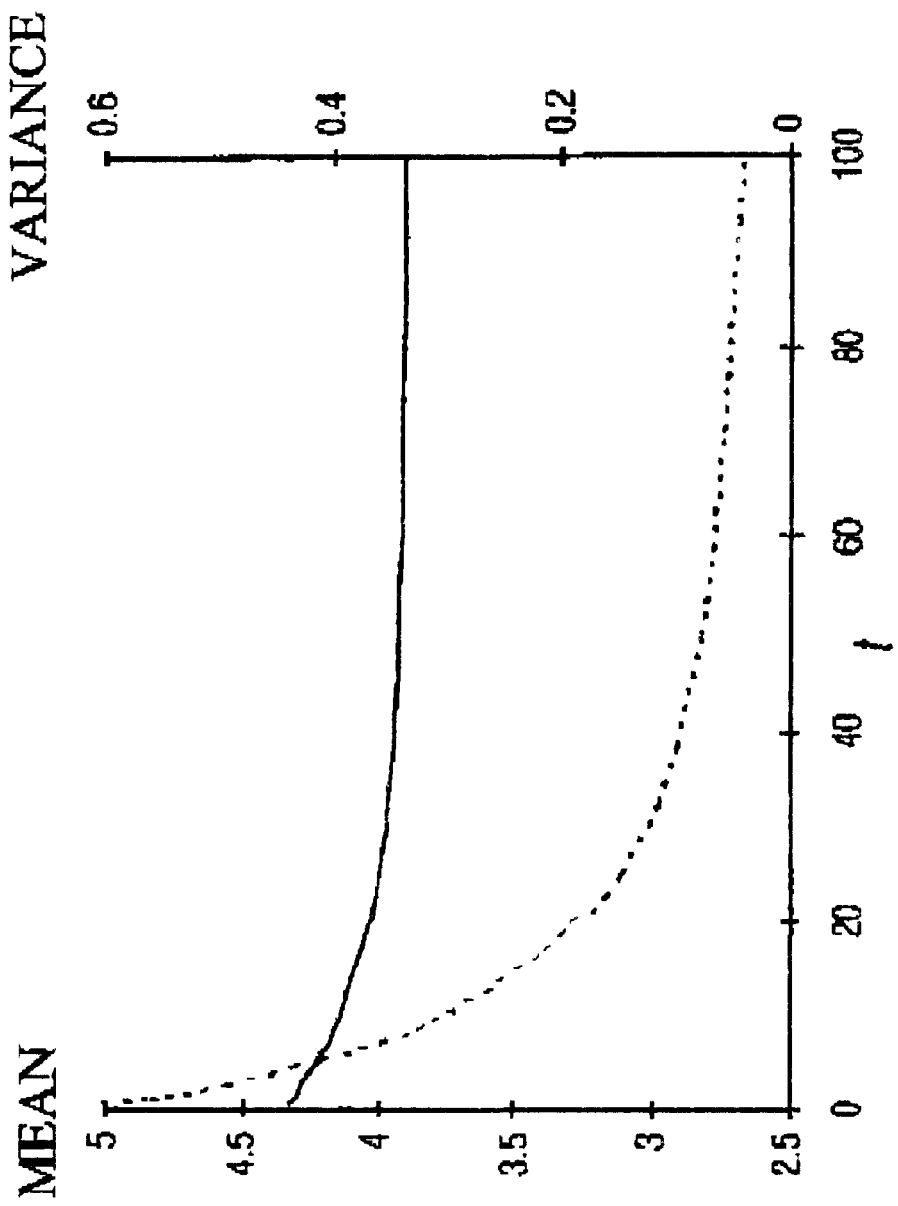
FIG. 5 is a graph illustrating the mean and the variance of the throughput of adaptive elastic flows as a function of their service time for an illustrative example of a transmission link system.

To get an impression of the relation of average throughput and throughput threshold constraints reference is made to FIG. 5, which illustrates the mean and the variance of the throughput of adaptive elastic flows as a function of their service time. The graph of FIG. 5 relates to the system considered for Table III, with $\lambda_2=14$. The mean throughput is shown by a solid line, whereas the variance is shown by a dashed line. It can thus be seen that for "short" (with respect to service time) connections, the variance of the throughput is quite significant, and consequently, the average throughput and the throughput threshold constraints have significantly different meaning. For "long" connections, the variance of the throughput almost vanishes, and the mean throughput provides a meaningful description of the bandwidth available for adaptive elastic flows. Note that $\theta_t$ tends to approach a deterministic value, the steady state throughput, as t goes to infinity.

Finally, we study an example of how to select $N_{EL2}$ and $N_{EL3}$ to provide the required QoS parameters. Assume that after the division of the link capacity and the dimensioning of the rigid class, the systems parameters have the following values:

C=100 Mbps;

$C_{COM}$=20 Mbps, $C_{ELA}$=80 Mbps;

$b_1$=1 Mbps, $b_2$=5 Mbps, $b_3$=3 Mbps;

$\lambda_1$=12 1/min, $\lambda_2$=12 1/min, $\lambda_3$=12 1/min;

$\mu_1=\mu_2=\mu_3$=1 s (here expressed as mean holding time);

$b_3^{min}$=0.1 Mbps;

The parameters $N_{EL2}$ and $N_{EL3}$ have to be such that the elastic blocking probabilities are less than 1% ($B_2$<0.01, $B_3$<0.01) and the average throughput parameters fulfill $E(\theta)\geq 4.05$ and $E(\hat{\theta})\geq 2.35$.

Figure 6:
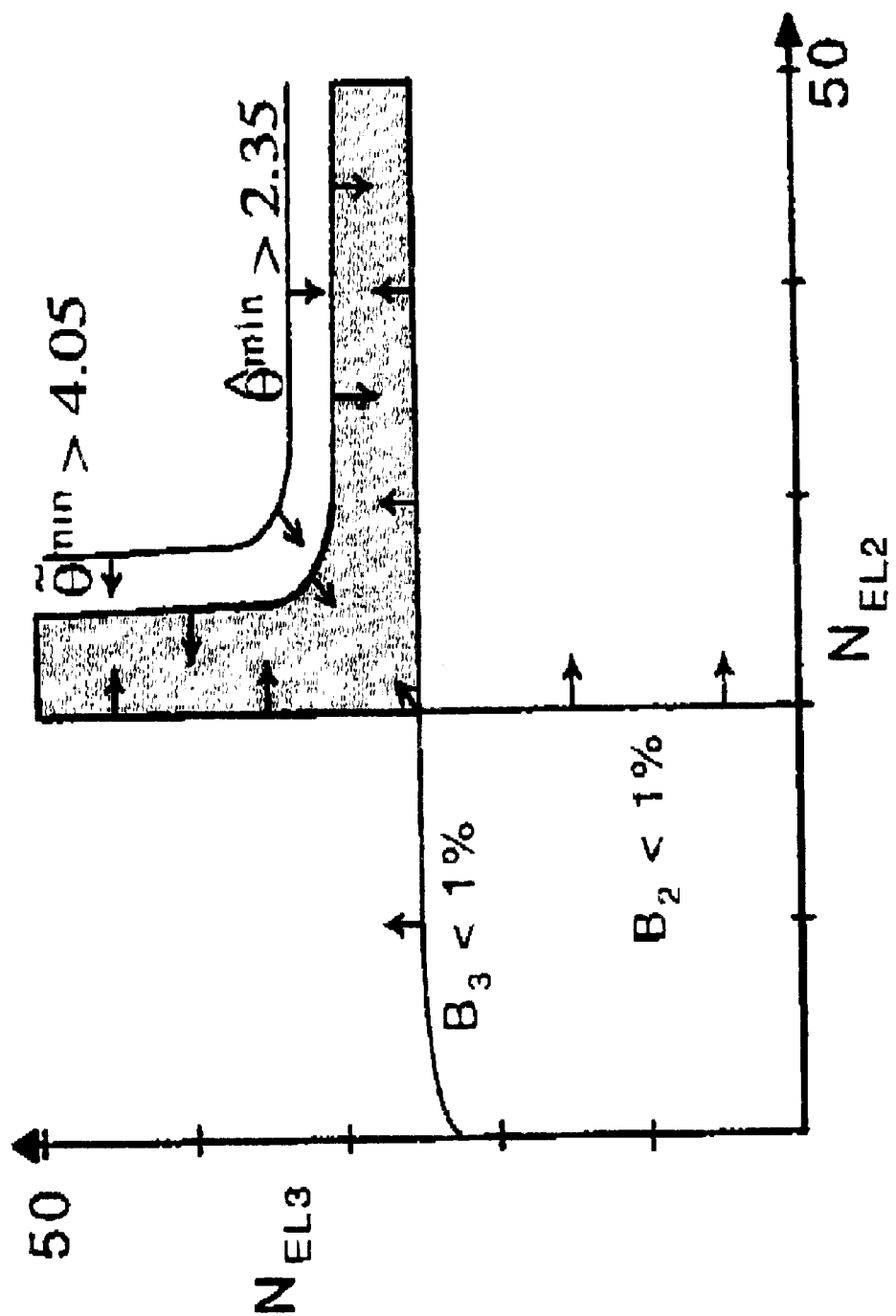
FIG. 6 is a schematic diagram illustrating the elastic cut-off parameters that fulfill given QoS requirements for an illustrative example of a link system.

The set of $N_{EL2}$ and $N_{EL3}$ parameters that fulfill the QoS requirements are depicted in the gray area of FIG. 6. The blocking probability limit of the adaptive elastic class is a vertical line due to the independence on the load of the non-adaptive elastic class. The blocking probability limit of the non-adaptive elastic class is a horizontal line. With the considered low level of overall load, the average elastic throughputs are hardly sensitive to the $N_{EL2}$ and $N_{EL3}$ parameters after a given limit. In this example, the tighter of the two bandwidth limits that determines the acceptable $N_{EL2}$ and $N_{EL3}$ values, is the $E(\theta)\geq 4.05$ bound.

Inversion of the Optimization Task

The new elastic POL policy allows for a natural inversion of the optimization task so that instead of minimizing blocking probabilities for elastic traffic under throughput constraints, the elastic throughputs are maximized under blocking probability constraints. In similarity to the link capacity sharing method illustrated in the flow diagram of FIG. 2, traffic input parameters are received (similar to step 101), the common link capacity part $C_{COM}$ is determined (similar to step 102) and initial values of the cut-off parameters are selected (similar to step 103). Next, the performance of the system is analyzed (similar to step 104), but now primarily with respect to elastic blocking probabilities. In particular, the elastic blocking probabilities in the system are analyzed and related (similar to step 105) to the blocking probability constraints. If the blocking probabilities are too high, then the cut-off parameters are increased, reducing the blocking probabilities and also reducing the throughputs. On the other hand, if the blocking probabilities are lower than the blocking constraints, then the cut-off parameters can be reduced so that the blocking probabilities as well as the throughputs are increased. In this way, by way of iteration, the throughputs can be increased to a maximum, while still adhering to the blocking constraints for elastic flows. As the aim now is to maximize the elastic throughputs, and as it might be advisable to have a worst-case guarantee for the through of elastic traffic, the cut-off parameters must be as low as possible, and at least low enough to fulfill the worst-case throughput constraints, while still fulfill the blocking probability constraints imposed on the elastic traffic.

Naturally, the link capacity sharing algorithm, irrespective of whether it is adapted for minimizing elastic blocking or for maximizing elastic throughput, is also applicable to elastic traffic only. For example, in the absence of rigid traffic, $C_{COM}$ is reduced to zero, and the overall link capacity sharing algorithm is reduced to the mathematical formulas for determining the cut-off parameters under throughput/blocking constraints. Furthermore, in the case of a single elastic traffic class, only a single cut-off parameter needs to be determined according to the above iterative link sharing algorithm.

Link Capacity Sharing Algorithm—the ATM Network Example

Although, the link capacity sharing algorithm has been described above with reference to an IP network carrying a single rigid traffic class and two different elastic traffic classes, it should be understood that the invention is not limited thereto, and that the algorithm is applicable to other types of networks and other traffic classes. In fact, an example of the elastic POL algorithm applied in an ATM network carrying narrow-band CBR (Constant Bit Rate) traffic and wide-band CBR traffic, as well as ABR (Available Bit Rate) traffic will be outlined below.

In this example, calls arriving at a transmission link generally belong to one of the following three traffic classes:

Class 1—Narrow-band CBR calls, characterized by their peak bandwidth requirement $b_1$, call arrival rate $\lambda_1$ and departure rate $\mu_1$.

Class 2—Wide-band CBR calls, characterized by their peak bandwidth requirement $b_2$, call arrival rate $\lambda_2$ and departure rate $\mu_2$.

Class 3—ABR calls, characterized by their peak bandwidth requirement $b_3$, minimum bandwidth requirement $b_3^{min}$, call arrival rate $\lambda_3$ and ideal departure rate $\mu_3$. The ideal departure rate is experienced when the peak bandwidth is available during the entire duration of the call.

It should be noted that the CBR classes can be likened by the rigid traffic class of the above IP network example, and that the ABR class can be likened by the non-adaptive elastic traffic class described above in connection with the IP network example. In this respect, the assumptions in the model formulated in the IP network example are equally applicable in the present example.

The elastic POL policy described above is applied to the mixed CBR-ABR traffic environment in the ATM network considered. This means that the link capacity C is divided into two parts, a common part $C_{COM}$ for CBR calls as well as ABR calls, and a dedicated part $C_{ABR}$, which is reserved for the ABR calls, such that $C=C_{COM}+C_{ABR}$. An admission control parameter $N_{ABR}$, also referred to as a cut-off parameter, is introduced for the ABR calls. Under the elastic POL policy, the number $n_1$, $n_2$ and $n_3$ of narrow-band CBR, wide-band CBR and ABR calls, respectively, in progress on the link is subject to the following constraints:

$$n_1 \cdot b_1 + n_2 \cdot b_2 \leq C_{COM} \quad (32)$$

$$N_{ABR} \cdot b_3^{min} \leq C_{ABR} \quad (33)$$

$$n_3 \leq N_{ABR} \quad (34)$$

In (1) the ABR calls are protected from CBR calls. In (2–3) the maximum number of ABR calls is limited by two constraints. Expression (2) protects CBR calls form ABR calls, while (3) protects the in-progress ABR calls from new ABR calls. In this case, the elastic POL policy is fully determined by the division of the lint capacity, specified by $C_{COM}$, and the admission control parameter $N_{ABR}$. The performance of the elastic POL policy is tuned by these parameters.

According to a preferred embodiment of the invention, the link capacity sharing algorithm aims at setting the output parameters $C_{COM}$ and $N_{ABR}$ of the elastic POL policy in such a way as to minimize the call blocking probability for the ABR calls, while being able to take into account blocking probability constraints (GoS) for the different types of CBR calls and a minimum throughput constraint for the ABR calls. Therefore, each CBR class is associated with a maximum accepted call blocking probability $B_1^{max}$ and $B_2^{max}$, and the ABR class is associated with a minimum accepted throughput $\theta_{min}$, which can be treated in similarity to the minimum accepted throughput $\hat{\theta}_{min}$ for the non-adaptive elastic traffic of the IP network example.

Although the ABR blocking probability is being minimized, it is nevertheless normally advisable, although not necessary, to have a worst-case guarantee of the call blocking probability for ABR calls, and associate also the ABR class with a maximum allowed blocking probability $B_3^{max}$.

The parameters and performance measures associated with the CBR classes and the ABR class are summarized in Table V below.

In this particular embodiment, the link capacity sharing algorithm aims at minimizing the blocking probability of the ABR calls under a minimum throughput constraint. To accomplish this, the invention proposes an iterative procedure, generally defined by steps 203–207, for tuning the cut-off parameter so that the throughput-threshold constraint is just fulfilled, generally no more and no less. First, in step 203, an initial value of the cut-off parameter is estimated. Next, the performance of the system is analyzed (step 204) with respect to the ABR throughput, and related (step 205) to the throughput-threshold constraint. If the ABR throughput is too low, then the cut-off parameter is reduced (step 206), increasing the blocking probability and also increasing the throughput. On the other hand, if the ABR throughput is higher than the throughput-threshold, then the cut-off parameter can be increased (step 207) so that the blocking probability (as well as the throughput) is reduced. In this way, by iteratively repeating the steps 204, 205 and 206/207, the ABR blocking probability can be reduced to a minimum, while still adhering to the throughput constraint.

Preferably, the performance measures, ABR throughput and possibly also ABR blocking, are analyzed in more or less the same way as described above in connection with the IP network example. In short, this means determining the steady state distribution of the Markov chain that describes the dynamics and behavior of the mixed CBR-ABR environment, and calculating blocking and throughput measures based on the determined distribution. It should though be noted that here the throughput-threshold constraint, analogous to expression (7), is checked based on the transient analysis of the Markov chain that describes the mixed

TABLE V

| | Input parameters | | | | | Performance measures | | System state |
| | | | | | | | | Number of flows |
| Class ⇓ | Call arrival rate | Departure rate | Peak bandwidth requirement | Minimum bandwidth requirement | Maximum accepted blocking probability | Minimum accepted throughout | Blocking | Through-put | in the system |
|---|---|---|---|---|---|---|---|---|---|
| N-CBR | $\lambda_1$ | $\mu_1$ | $b_1$ | — | $B_1^{max}$ | — | $B_1$ | — | $n_1$ |
| W-CBR | $\lambda_2$ | $\mu_2$ | $b_2$ | — | $B_2^{max}$ | — | $B_2$ | — | $n_2$ |
| ABR | $\lambda_3$ | $\mu_3$ | $b_3$ | $b_3^{min}$ | $(B_3^{max})$ | $\theta_{min}$ | $B_3$ | $\theta$ | $n_3$ |

Figure 7:
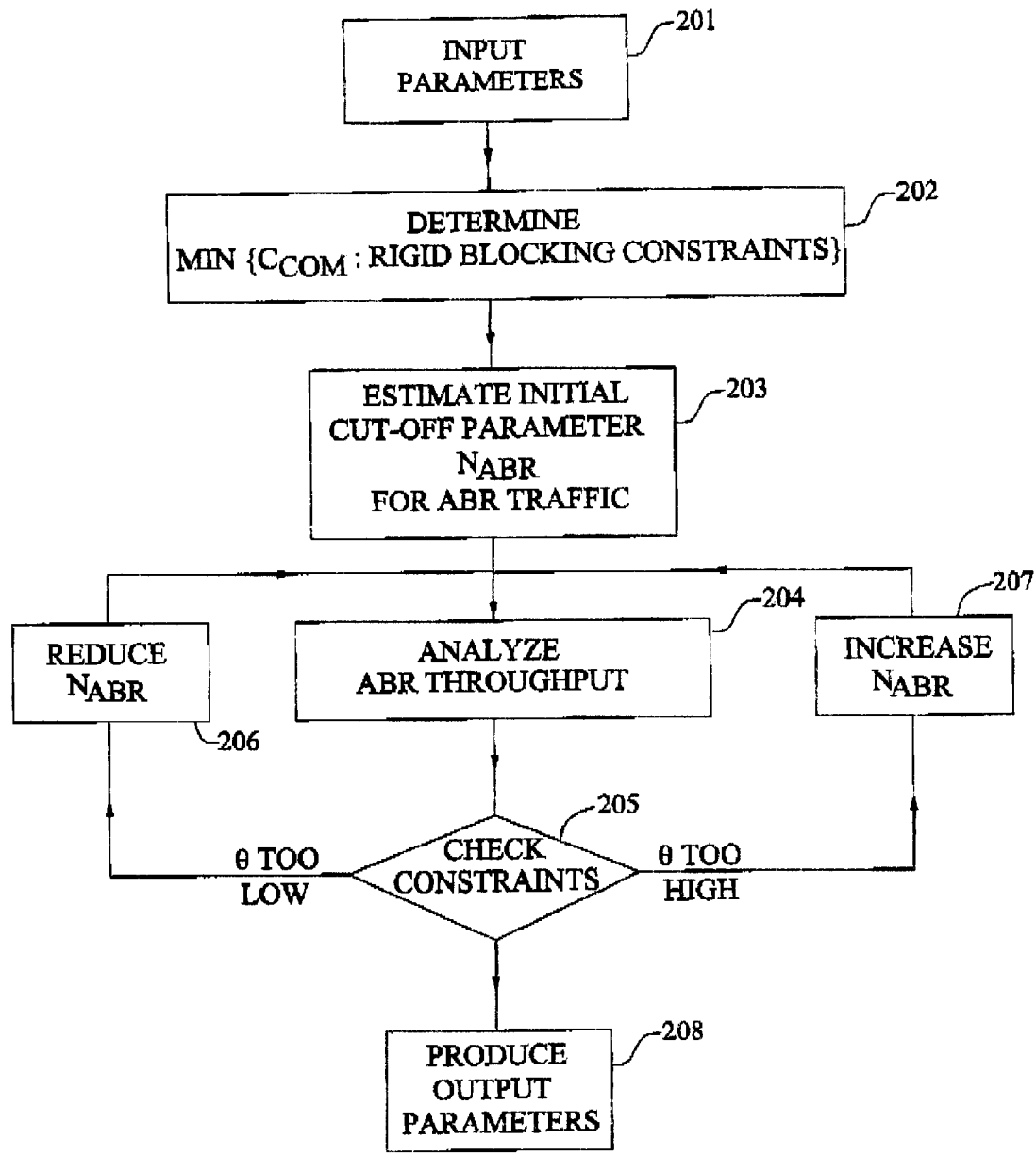
FIG. 7 is a schematic flow diagram of the overall link capacity sharing algorithm for a mixed CBR-ABR traffic environment according to a preferred embodiment of the invention.

The problem of determining the output parameters of the elastic POL policy under the above constraints is outlined below with reference to FIG. 7, which is a schematic flow diagram of the overall link capacity sharing algorithm for a mixed CBR-ABR traffic environment according to a preferred embodiment of the invention. In the first step 201, the required input parameters are provided. In step 202, the GoS (call blocking) requirement for CBR traffic is guaranteed by the proper setting of $C_{COM}$. In particular, we determine the minimum required capacity of $C_{COM}$ for CBR calls that guarantees the required blocking probabilities $B_1^{max}$ and $B_2^{max}$:

$$\min\{C_{COM}: B_1 \leq B_1^{max}, B_2 \leq B_2^{max}\} \quad (35)$$

For example, the well-known Erlang-B formula can be used to estimate such a value of $C_{COM}$ based on arrival and de e rates and peak bandwidth requirements for the CBR classes as inputs.

Next, we have to determine a maximum number of ABR calls ($N_{ABR}$) that can be simultaneously present in the system at the same time as the required throughput and blocking requirements are fulfilled.

CBR-ABR environment using the numerical method proposed in reference [11] and applying the Markov inequality.

It is of course possible to invert the optimization task also for the ATM network example, in substantially the same manner as explained above for the IP network example.

Numerical Examples of the Application of the Link Capacity Sharing Algorithm

By way of example, consider an ATM transmission link of capacity C=155 Mbps and supporting three different service classes; two CBR classes and an ABR class, as described above. The input parameters of this ATM transmission link system are:

$b_1$ (n-CBR)=3 Mbps, $b_2$ (w-CBR)=6 Mbps, $b_3$ (ABR)=10 Mb;ps $\lambda_1$=6 1/s, $\lambda_2$=3 1/s, $\lambda_3$=12 1/s;

$\mu_1=\mu_2=\mu_3$=1 1/min;

$r_2^{min}$=0.05, $r_3^{min}$=0.001;

$N_{COM}$=50.

Furthermore, it is required that the blocking probabilities of the narrow-band and wide-band CBR calls are less than $B_1^{max}$=2% and $B_2^{max}$=4%, respectively. It thus follows that the minimal bandwidth for $C_{COM}$ necessary to provide these blocking probabilities is 60 Mbps, which leaves $C_{ABR}$=95 Mbps for the ABR calls.

To examine the trade-off between throughput and blocking probability for the ABR traffic, reference is made to Table VI below, which illustrates the average throughput $E(\theta)$ and the blocking probability $B_3$ for the ABR traffic class for different values of $N_{ABR}$.

TABLE VI

| $N_{ABR}$ | 10 | 20 | 40 | 60 | 80 | 100 | 150 |
|---|---|---|---|---|---|---|---|
| $B_3$ | 0.310 | 0.0811 | 0.0320 | 0.0212 | 0.00141 | 0.00112 | 0.000461 |
| $E(\theta)$ | 9.99 | 7.9 | 4.83 | 3.45 | 2.69 | 2.2 | 1.52 |

From Table VI, the trade-off between throughput and blocking is apparent; high-blocking=high throughput, and low blocking=low throughput. In the elastic POL policy according to the invention, this trade-off is conveniently controlled by means of the $N_{ABR}$ cut-off parameter as can be seen from Table VI. For instance, when constraint $\theta^{min}$ on the average throughput is set to 2.2 Mbps, the maximum number ($N_{ABR}$) of simultaneously active ABR calls is limited to 100.

In simulations, it has been observed that the elastic POL policy is superior to the well-known Complete Partitioning (CP) policy under all loads, both in terms of blocking probabilities and ABR throughput. This is partly due to the fact that the POL policy allows ABR calls to make use of any bandwidth of the $C_{COM}$ part currently not used by CBR calls.

Finally, to examine the impact of the $C_{COM}$ parameter on the blocking probabilities and the average throughput of ABR traffic, reference is made to Table VII below.

TABLE VII

| $C_{COM}$ | 69 | 66 | 63 | 60 | 57 | 54 |
|---|---|---|---|---|---|---|
| $B_1$ | 0.00498 | 0.00770 | 0.0116 | 0.0171 | 0.0244 | 0.0342 |
| $B_2$ | 0.0126 | 0.0192 | 0.0284 | 0.0411 | 0.0578 | 0.0794 |
| $B_3$ | 0.0149 | 0.0141 | 0.0129 | 0.0115 | 0.00973 | 0.00773 |
| $E(\theta)$ | 2.04 | 2.08 | 2.13 | 2.20 | 2.31 | 2.46 |

The $C_{COM}$ parameter offers a way of controlling the trade-off between the CBR blocking probabilities on one hand, and the ABR blocking probability and throughput on the other hand. Prom Table VII, it can be seen that both the ABR throughput (increasing) and the ABR blocking (decreasing) are improved at the expense of degrading CBR blocking probabilities.

It is important to understand that the preceding description is intended to serve as a framework for an understanding of the invention. The embodiments described above are merely given as examples, and it should be understood that the present invention is not limited thereto. Further modifications, changes and improvements which retain the basic underlying principles disclosed and claimed herein are within the scope and spirit of the invention.

REFERENCES

[1] L. Massoulie, J. Roberts, "Bandwidth Sharing: Objectives and Algorithms", IEEE Infocom '99, pp. 1395–1403, March 1999.

[2] L. Massoulie, J. Roberts, "Bandwidth Sharing and Admission Control for Elastic Traffic", ITC Specialist Seminar, Yokohama, October 1998.

[3] L. Massoulie, J. Roberts, "Arguments in Favour of Admission Control for TCP Plows", 16th International Teletraffic Congress, Edinburgh, UK, June, 1999.

[4] R. J. Gibbens and F. P. Kelly, "Distributed Connection Acceptance Control for a Connectionless Network", 16th International Teletraffic Congress, Edinburgh, UK, June, 1999.

[5] F. P. Kelly, "Charging and Rate Control for Elastic Traffic", European Transaction on Telecommunications, pp. 33–37, Vol. 8, 1997.

[6] Wu-chang Feng, Dilip D. Kandlur, Debanjan Saha and Kang. G. Shin, "Understanding and Improving TCP Performance Over Networks with Minimum Rate Guarantees", IEEE/ACM Transactions on Networking, pp. 173–187, Vol. 7, No. 2, April 1999.

[7] E. D. Sykas, K. M. Vlakos, I. S. Venieris, E. N. Protonotarios, "Simulative Analysis of Optimal Resource Allocation and Routing in IBCN's", IEEE J-SAC, Vol. 9, No. 3, 1991.

[8] Keith W. Ross, "Multi-service Loss Models for Broadband Telecommunication Networks", Springer-Verlag, 1995, ISBN 3-540-19918-7.

[9] W. J. Stewart, "Introduction to the Numerical Solution of Markov Chains", pp. 220–221, Princeton University Press, Princeton, N.J., ISBN 0-691-03699-3, 1994.

[10] M. Frontini, A. Tagliani, "Entropy-convergence in Stieltjes and Hamburger moment problem", Appl. Math. and Comp., 88, pp. 39–51, 1997.

[11] M. Telek and S. Rácz, "Numerical analysis of large Markov reward models", *Performance Evaluation*, 36&37:95–114, August 1999.

[12] A. Smith, J. Adams, G. Tagg, "Available Bit Rate—A New Service for ATM", Computer Networks and ISDN Systems, 28, pp. 635–640, 1996.

What is claimed is:

1. A method for sharing link capacity in a network comprising the steps of:
   receiving network traffic input parameters;
   dividing said link capacity into a first part common to elastic traffic and non-elastic traffic and a second part dedicated for elastic traffic, based on at least part of said network traffic input parameters; and
   determining at least one admission control parameter for said elastic traffic based on said division of link capacity and at least part of said network traffic input parameters.

2. The method according to claim 1, further comprising the step of exercising admission control for elastic traffic flows based on said determined admission control parameter(s).

3. The method according to claim 1, wherein said dividing step includes the step of determining a minimum required capacity of said common part relating to non-elastic traffic given at least one maximum allowed blocking probability for said non-elastic traffic.

4. The method according to claim 1, wherein said step of determining at least one admission control parameter comprises the step of determining a maximum number of admissible elastic traffic flows based on at least one call-level constraint imposed on said elastic traffic.

5. The method according to claim 4, wherein said step of determining a maximum number of admissible elastic traffic flows is based on a call-level model for elastic traffic, and said call-level constraint(s) is related to at least one of throughput and blocking probability of said elastic traffic.

6. The method according to claim 5, wherein said step of determining a maximum number of admissible elastic traffic flows comprises the steps of:
   determining an initial value of the number of admissible elastic traffic flows on a link in said network;

iteratively performing the steps of:
  i) evaluating said throughput/blocking constraint(s) imposed on said elastic traffic based on the initial/current value of the number of admissible elastic traffic flows; and
  ii) adjusting said number of admissible elastic traffic flows based on said evaluation; and
  terminating said iteration process and extracting said maximum number of admissible elastic traffic flows when said constraint(s) is/are met.

7. The method according to claim 6, wherein said step of adjusting said number of admissible elastic traffic flows based on said evaluation comprises the steps of:
  reducing said number of admissible elastic traffic flows if a value related to the throughput of said elastic traffic flows is lower than a predetermined threshold given by said throughput/blocking constraint(s); and
  increasing said number of admissible elastic traffic flows if said throughput related value is higher than said threshold.

8. The method according to claim 4, wherein said step of determining said maximum number of admissible elastic connections is based on minimizing the blocking probability of requested elastic traffic connections with respect to the number of admissible elastic traffic connections under at least one throughput-threshold constraint for in-progress elastic traffic connections.

9. The method according to claim 8, wherein said minimization of the blocking probability of elastic traffic under at least one throughput-threshold constraint is performed also under at least one given constraint on maximum allowed blocking probability for elastic traffic.

10. The method according to claim 4, wherein said step of determining said maximum number of admissible elastic connections is based on maximizing the elastic traffic throughput with respect to the number of admissible elastic traffic connections under at least one blocking probability constraint for requested elastic traffic connections.

11. The method according to claim 1, wherein said elastic traffic comprises a number of elastic traffic classes, and said step of determining at least one admission control parameter comprises the step of determining, for each of one said elastic traffic classes, a maximum number of admissible elastic traffic flows based on a respective throughput/blocking probability constraint imposed on the elastic traffic class.

12. The method according to claim 1, wherein said network traffic input parameters include at least said link capacity, at least one blocking probability constraint for non-elastic traffic, and at least one throughput/blocking constraint for elastic traffic.

13. The method according to claim 1, wherein said network traffic input parameters further include arrival and departure rates as well as peak bandwidth requirements for nonelastic and elastic traffic, and a minimum bandwidth requirement for elastic traffic.

14. The method according to claim 1, wherein said elastic traffic comprises at least one of the following: adaptive elastic traffic flows of Internet Protocol (IP) networks, non-adaptive elastic traffic flows of IP networks, and Available Bit Rate (ABR) flows of ATM networks.

15. A method for allocating link bandwidth among and within different traffic classes in a network, wherein said traffic classes include at least one elastic traffic class, said method comprising the steps of:
  partitioning said link bandwidth into a first part common to all traffic classes, and a second part dedicated to connections of said elastic traffic class(es); and
  allocating said second dedicated part of said link bandwidth to connections of said elastic traffic class(es) based on link bandwidth utilization under at least one throughput/blocking constraint imposed on the connections of said elastic traffic class(es).

16. The method according to claim 15, further comprising the step of allocating a minimum required bandwidth of said common part to connections of non-elastic traffic classes given at least one maximum allowed blocking probability for said non-elastic traffic connections.

17. The method according to claim 15, further comprising the step of determining a maximum number of admissible elastic traffic connections on the link based on said throughput/blocking constraint(s),
  wherein said step of allocating bandwidth to connections of said elastic traffic class(es) is based on said maximum number of admissible elastic traffic connections.

18. The method according to claim 17, wherein said step of determining a maximum number of admissible elastic traffic connections is based on minimizing the blocking probability of elastic traffic connections with respect to the number of admissible elastic traffic connections under at least one throughput-threshold constraint for in-progress elastic traffic connections.

19. The method according to claim 17, wherein said step of determining a maximum number of admissible elastic traffic connections is based on maximizing the throughput of in-progress elastic traffic connections with respect to the number of admissible elastic traffic connections under at least one blocking probability constraint for requested elastic traffic connections.

20. The method according to claim 17, wherein said step of determining a maximum number of admissible elastic traffic connections comprises the steps of:
  determining an initial value of the number of admissible elastic traffic connections on said link;
  iteratively performing the steps of:
    i) determining throughput/blocking-probability measures based on the initial/current of the number of admissible elastic traffic connections on said link;
    ii) evaluating said throughput/blocking constraint(s) imposed on said elastic traffic based on the determined throughput/blocking measures; and
    iii) adjusting said number of admissible elastic traffic connections based on said evaluation; and
  terminating said iteration process and extracting said maximum number of admissible elastic traffic connections when substantially meeting said constraint(s).

21. An electronically implemented method for sharing link capacity among elastic traffic connections in a network, comprising the steps of:
  receiving network traffic input parameters;
  determining a maximum number of admissible elastic traffic connections on said link based on said network traffic input parameters, based on maximizing the throughput of in-progress elastic traffic connections with respect to the number of admissible elastic traffic connections under at least one blocking probability constraint for requested elastic traffic connections, said input parameters including at least one throughput/blocking constraint imposed on said elastic traffic;
  receiving requests for elastic traffic connections on a link in said network; and exercising admission control for said requested elastic traffic connections based on said determined maximum number of admissible elastic traffic connections.

22. The method according to claim 21, wherein said step of determining a maximum number of admissible elastic connections is based on minimizing the blocking probability of requested elastic traffic connections with respect to the number of admissible elastic traffic connections under at least one throughput-threshold constraint for in-progress elastic traffic connections.

23. The method according to claim 21, wherein said step of determining a maximum number of admissible elastic traffic connections comprises the steps of:
   initially determining a number of admissible elastic traffic connections on said link;
   iteratively performing the steps of:
   i) evaluating said throughput/blocking constraint(s) imposed on said elastic traffic based on the current number of admissible elastic traffic connections on said link; and
   ii) adjusting said number of admissible elastic traffic connections based on said evaluation; and
   terminating said iteration process and extracting said maximum number of admissible elastic traffic connections when said constraint(s) is/are met.

24. The method according to claim 23, wherein said step of adjusting said number of admissible elastic traffic connections based on said evaluation comprises the step of selectively, in dependence on the relation between a throughput/blocking measure and said throughput/blocking constraint(s), reducing or increasing said number of admissible elastic traffic connections.

25. The method according to claim 21, wherein:
   said elastic traffic comprises a number of elastic traffic classes;
   said step of determining a maximum number of admissible elastic traffic connections on said link comprises the step of determining, for each of said elastic traffic classes, a traffic-class specific maximum number of admissible elastic traffic flows based on a respective throughput/blocking probability constraint imposed on the elastic traffic class in question; and
   said method further comprises the steps of:
   determining the associated traffic class for each of said requested connections; and
   controlling admission of each requested connection based on the corresponding traffic-class specific maximum number of admissible elastic connections.

26. The method according to claim 21, wherein said network traffic input parameters include link capacity, arrival and departure rates, peak bandwidth and minimum bandwidth requirements for elastic traffic as well as at least one throughput/blocking constraint imposed on said elastic traffic.

27. A device for sharing link capacity in a network, comprising:
   means for receiving network traffic input parameters;
   means for dividing said link capacity into a first part common to elastic traffic and non-elastic traffic and a second part dedicated for elastic traffic, based on at least part of said network traffic input parameters; and
   means determining at least one admission control parameter for said elastic traffic based on said division of link capacity and at least part of said network traffic input parameters.

28. The device according to claim 27, further comprising means for exercising admission control for elastic traffic flows based on said determined admission control parameter(s).

29. The device according to claim 27, wherein said dividing means includes means for determining a minimum required capacity of said common part relating to non-elastic traffic given at least one maximum allowed blocking probability for said non-elastic traffic.

30. The device according to claim 27, wherein said means for determining at least one admission control parameter comprises means for determining a maximum number of admissible elastic traffic flows based on at least one throughput/blocking constraint imposed on said elastic traffic.

31. The device according to claim 30, wherein said means for determining a maximum number of admissible elastic traffic flows is configured for:
   initially determining a number of admissible elastic traffic flows on a link in said network;
   iteratively evaluating said throughput/blocking constraint(s) imposed on said elastic traffic based on the current number of admissible elastic traffic flows and adjusting said number of admissible elastic traffic flows based on said evaluation; and
   terminating said iteration process and extracting said maximum number of admissible elastic traffic flows when meeting said constraint(s).

32. The device according to claim 30, wherein said means for determining a maximum number of admissible elastic traffic flows is configured to determine said maximum number based on minimizing the blocking probability of requested elastic traffic connections with respect to said maximum number of admissible elastic traffic connections under at least one throughput-threshold constraint for in-progress elastic traffic connections.

33. The device according to claim 30, wherein said means for determining a maximum number of admissible elastic traffic flows is configured to determine said maximum number based on maximizing elastic traffic throughput with respect to said maximum number of admissible elastic traffic connections under at least one blocking probability constraint for elastic traffic.

34. The device according to claim 27, wherein said receiving means receives network traffic input parameters including said link capacity, arrival and departure rates and peak bandwidth requirements for non-elastic as well as elastic traffic, a minimum bandwidth requirement for elastic traffic, at least one blocking probability constraint for non-elastic traffic, and at least one throughput/blocking constraint for elastic traffic.

35. The device according to claim 27, wherein said elastic traffic comprises at least one of the following, adaptive elastic traffic flows of Internet Protocol (IP) networks, non-adaptive elastic traffic flows of IP networks, and available bit rate (ABR) flows of ATM networks.

36. An electronic system for allocating link bandwidth among and within different traffic classes in a network, at least one of said different traffic classes being an elastic traffic class, said electronic system comprising:
   a processor configured for:
   partitioning said link bandwidth into a first part common to all traffic classes, and a second part dedicated to connections of said elastic traffic class(es); and
   allocating said second dedicated part of said link bandwidth to connections of said elastic traffic class(es) based on link bandwidth utilization under at least one throughput/blocking constraint imposed on the connections of said elastic traffic class(es).

37. The electronic system according to claim 36, wherein said processor is configured for allocating a minimum required bandwidth of said common part to connections of non-elastic traffic classes given at least one maximum allowed blocking probability for said non-elastic traffic connections.

38. The electronic system according to claim 36, wherein said processor is further configured for determining a maximum number of admissible elastic traffic connections on the link based on said throughput/blocking constraint(s), and for allocating bandwidth to said elastic traffic connections based on said dedicated part of the link bandwidth as well as said maximum number of admissible elastic traffic connections.

39. The electronic system according to claim 38, wherein said processor is further configured for determining said maximum number of admissible elastic connections based on minimizing the blocking probability of elastic traffic connections with respect to the number of admissible elastic traffic connections under at least one throughput-threshold constraint for in-progress elastic traffic connections.

40. The electronic system according to claim 38, wherein said processor is further configured for determining said maximum number of admissible elastic connections based on maximizing the throughput of elastic traffic connections with respect to the number of admissible elastic traffic connections under at least one blocking probability constraint for elastic traffic connections.

41. An electronic system for sharing link capacity among elastic traffic connections in a network, comprising a processor responsive to network traffic input parameters and configured for:
   determining a maximum number of admissible elastic traffic connections based on at least one throughput/blocking constraint imposed on said elastic traffic, based on minimizing the blocking probability of requested elastic traffic connections with respect to said maximum number of admissible elastic traffic connections under at least one throughput-threshold constraint for in-progress elastic traffic connections;
   receiving request for elastic traffic connections; and
   exercising admission control for said:requested elastic traffic connections based on said determined maximum number of admissible elastic traffic flows.

42. The electronic system according to claim 41, wherein said processor is further configured for determining said maximum number of admissible elastic connections based on iteratively improving link bandwidth utilization under said throughput/blocking constraint(s).

43. The electronic system according to claim 42, wherein said processor is further configured for determining said maximum of admissible elastic connections based on maximizing elastic traffic, throughput with respect to said maximum number of admissible elastic traffic connections under at least one blocking probability constraint for elastic traffic.

44. A method for link bandwidth sharing in an admission-control enabled IP network, comprising the step of:
   applying a call-level model of a link carrying a number n, where n is an integer equal to or greater than 1, of elastic traffic classes for dimensioning the link bandwidth sharing for throughput-blocking optimality, wherein said call-level model is defined by:
   said link having a predetermined bandwidth capacity C; and
   for each one of said n elastic traffic classes, the elastic traffic being modeled as:
      i) having a peak bandwidth requirement and a minimum bandwidth requirement;
      ii) occupying the maximum possible bandwidth within said peak and minimum bandwidth requirements; and
      iii) being associated with at least one of a minimum accepted throughput and a maximum accepted blocking probability.

45. The method according to claim 44, wherein, for each one of said n traffic classes, the elastic traffic is further being modeled as:
   iv) arriving dynamically according to a Poisson process and being associated with an arrival rate as well as a departure rate;
   v) sharing proportionally equally the bandwidth available for the elastic traffic class among the elastic flows; and
   vi) being associated with a minimum holding time.

46. The method according to claim 44, wherein said n elastic traffic classes include a first traffic class for adaptive elastic flows, and a second traffic class for non-adaptive elastic flows.

47. A method for determining a steady state distribution of Markov chain describing the dynamics of a network link carrying traffic of a number of traffic classes including a non-adaptive elastic traffic class, said method comprising the steps of:
   determining a link capacity sharing policy for said link;
   determining a multi-dimensional Markov chain having a set of feasible states for the number of active connections of said traffic classes according to constraints imposed by said link sharing policy;
   calculating an initial approximation of the steady state distribution of said Markov chain based on Markov chain product form calculations; and
   iteratively determining the steady state distribution starting from said initial approximation of the steady state distribution.

48. The method according to claim 47, wherein said step of calculating an initial approximation of the steady state distribution comprises the steps of:
   determining the steady state distribution of traffic classes other than said non-adaptive traffic class as if there is no non-adaptive elastic traffic in the system; and
   determining state probabilities assuming equilibrium of the incoming and outgoing traffic of one of said other traffic classes and said non-adaptive elastic traffic class.

49. The method according to claim 47, wherein said step of iteratively determining the steady state distribution is based on a biconjugate gradient method.

50. The method according to claim 47, wherein blocking probabilities for said traffic classes are calculated based on a steady state distribution resulting from said iterative determination.

* * * * *